(12) United States Patent
Mossberg et al.

(10) Patent No.: US 8,165,436 B2
(45) Date of Patent: Apr. 24, 2012

(54) HIGHLY EFFICIENT OPTICAL GRATINGS WITH REDUCED THICKNESS REQUIREMENTS AND IMPEDANCE-MATCHING LAYERS

(75) Inventors: Thomas W. Mossberg, Eugene, OR (US); Christoph M. Greiner, Eugene, OR (US); Dmitri Iazikov, Eugene, OR (US)

(73) Assignee: LightSmyth Technologies Inc., Eugene, OR (US)

( * ) Notice: Subject to any disclaimer, the term of this patent is extended or adjusted under 35 U.S.C. 154(b) by 414 days.

(21) Appl. No.: 12/265,721

(22) Filed: Nov. 5, 2008

(65) Prior Publication Data

US 2009/0116790 A1    May 7, 2009

Related U.S. Application Data

(60) Provisional application No. 61/002,059, filed on Nov. 5, 2007, provisional application No. 61/005,647, filed on Dec. 5, 2007, provisional application No. 61/011,589, filed on Jan. 18, 2008, provisional application No. 61/068,544, filed on Mar. 6, 2008, provisional application No. 61/126,757, filed on May 6, 2008.

(51) Int. Cl.
*G02B 6/34* (2006.01)
*G02B 6/10* (2006.01)

(52) U.S. Cl. .......................................... 385/37; 385/131

(58) Field of Classification Search .................... 385/37, 385/131
See application file for complete search history.

(56) References Cited

U.S. PATENT DOCUMENTS

| | | | | |
|---|---|---|---|---|
| 5,007,708 | A * | 4/1991 | Gaylord et al. | 359/569 |
| 6,067,392 | A | 5/2000 | Wakami et al. | |
| 7,109,904 | B2 | 9/2006 | Shiokazi et al. | |
| 7,164,532 | B2 | 1/2007 | Funato et al. | |
| 7,167,615 | B1 * | 1/2007 | Wawro et al. | 385/37 |
| 7,474,396 | B2 * | 1/2009 | Wu et al. | 356/301 |
| 2002/0135876 | A1 * | 9/2002 | Holm et al. | 359/566 |
| 2005/0070027 | A1 * | 3/2005 | Gollier et al. | 436/518 |

(Continued)

FOREIGN PATENT DOCUMENTS

EP    1 783 520    5/2007

(Continued)

OTHER PUBLICATIONS

International Search Report and Written Opinion of the International Search Authority dated Aug. 6, 2009 for counterpart App No. PCT/US2008/082538.

(Continued)

*Primary Examiner* — K. Cyrus Kianni
(74) *Attorney, Agent, or Firm* — David S. Alavi

(57) ABSTRACT

An optical grating comprising a grating layer and two surface layers, the layers being arranged with the grating layer between the surface layers. The grating layer comprises a set of multiple, discrete, elongated first grating regions that comprise a first dielectric material and are arranged with intervening elongated second grating regions. The bulk refractive index of the dielectric material of the first grating regions is larger than the bulk refractive index of the second grating regions. The first surface layer comprises a first impedance matching layer, and the second surface layer comprises either (i) a second impedance matching layer or (ii) a reflective layer. Each said impedance matching layer is arranged to reduce reflection of an optical signal transmitted through the corresponding surface of the grating layer, relative to reflection of the optical signal in the absence of said impedance matching layer.

19 Claims, 37 Drawing Sheets

U.S. PATENT DOCUMENTS

| | | | |
|---|---|---|---|
| 2006/0001969 A1* | 1/2006 | Wang et al. | 359/494 |
| 2006/0023310 A1 | 2/2006 | Putnam et al. | |
| 2006/0024013 A1* | 2/2006 | Magnusson et al. | 385/129 |
| 2006/0193550 A1* | 8/2006 | Wawro et al. | 385/12 |
| 2008/0158570 A1* | 7/2008 | Gollier et al. | 356/521 |
| 2008/0180693 A1* | 7/2008 | Dillon et al. | 356/521 |
| 2008/0259348 A1* | 10/2008 | Judell et al. | 356/511 |
| 2008/0316485 A1* | 12/2008 | Wawro et al. | 356/328 |
| 2009/0041971 A1* | 2/2009 | Wang et al. | 428/54 |

FOREIGN PATENT DOCUMENTS

| | | |
|---|---|---|
| KR | 10-0357247 | 1/2003 |
| WO | WO-97/14983 | 4/1997 |

OTHER PUBLICATIONS

Wang et al, Deep-etched high-density fused-silica transmission gratings with high efficiency at a wavelength of 1550 nm, Applied Optics, vol. 45 p. 2567 (2006).

* cited by examiner

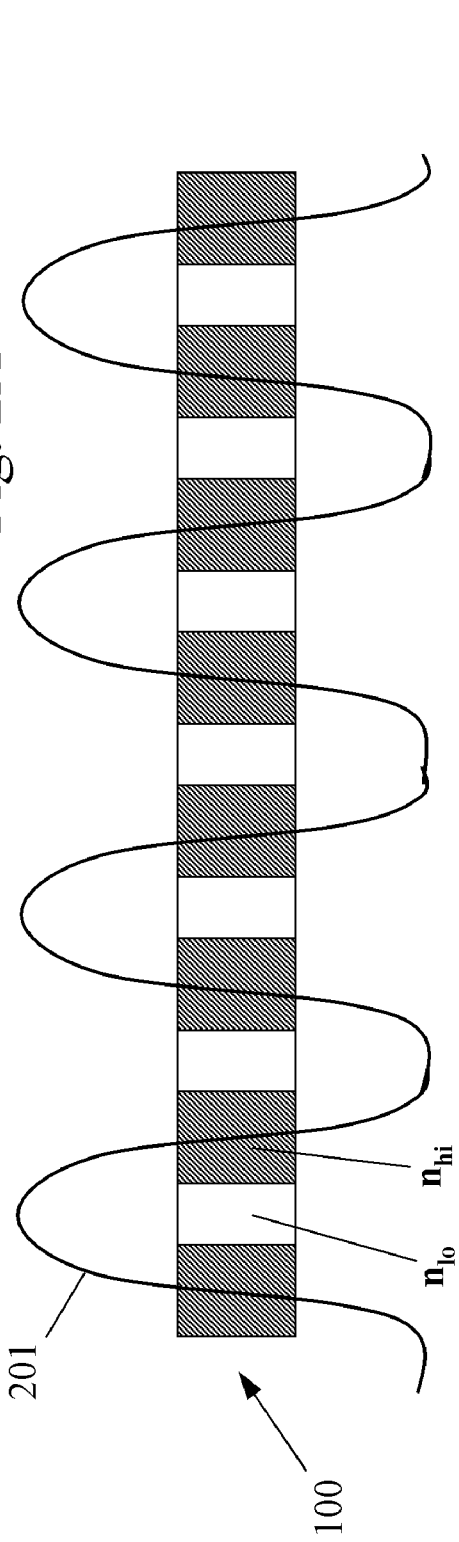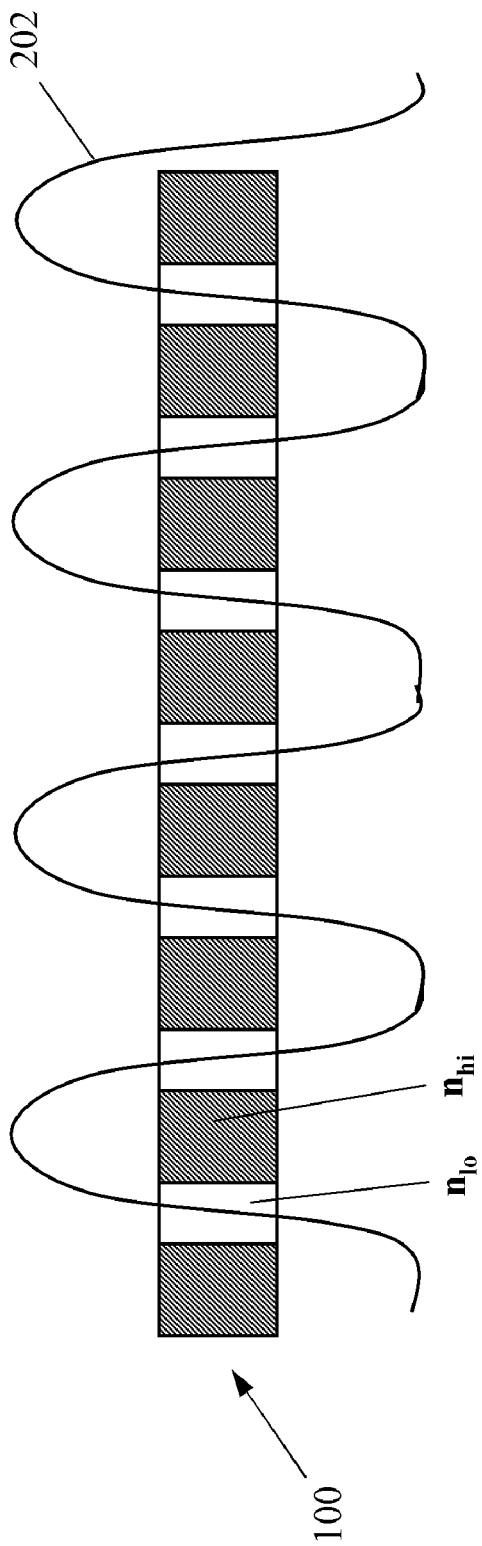

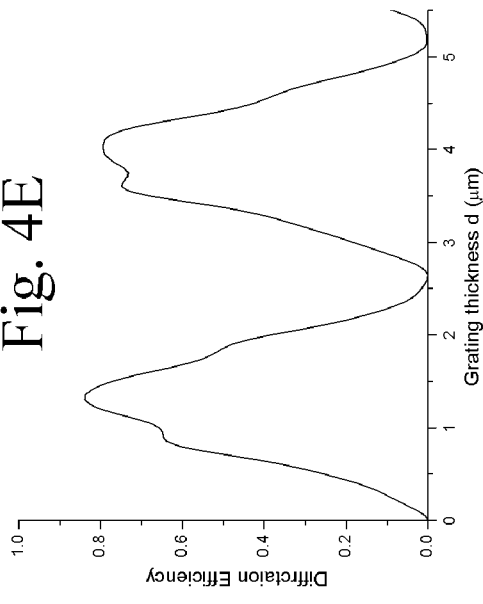
Fig. 4E
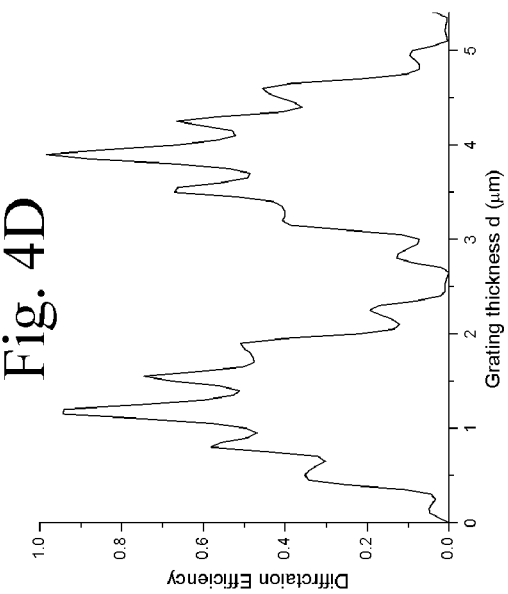
Fig. 4D
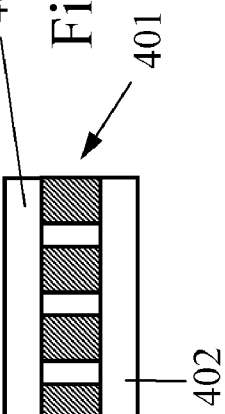
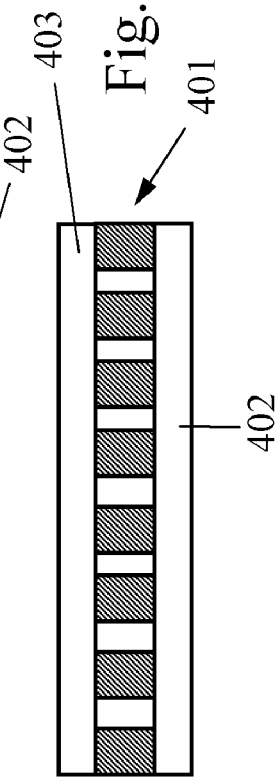
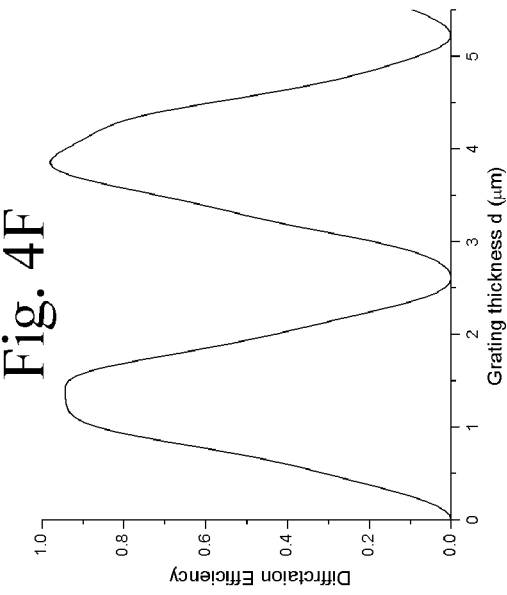
Fig. 4F

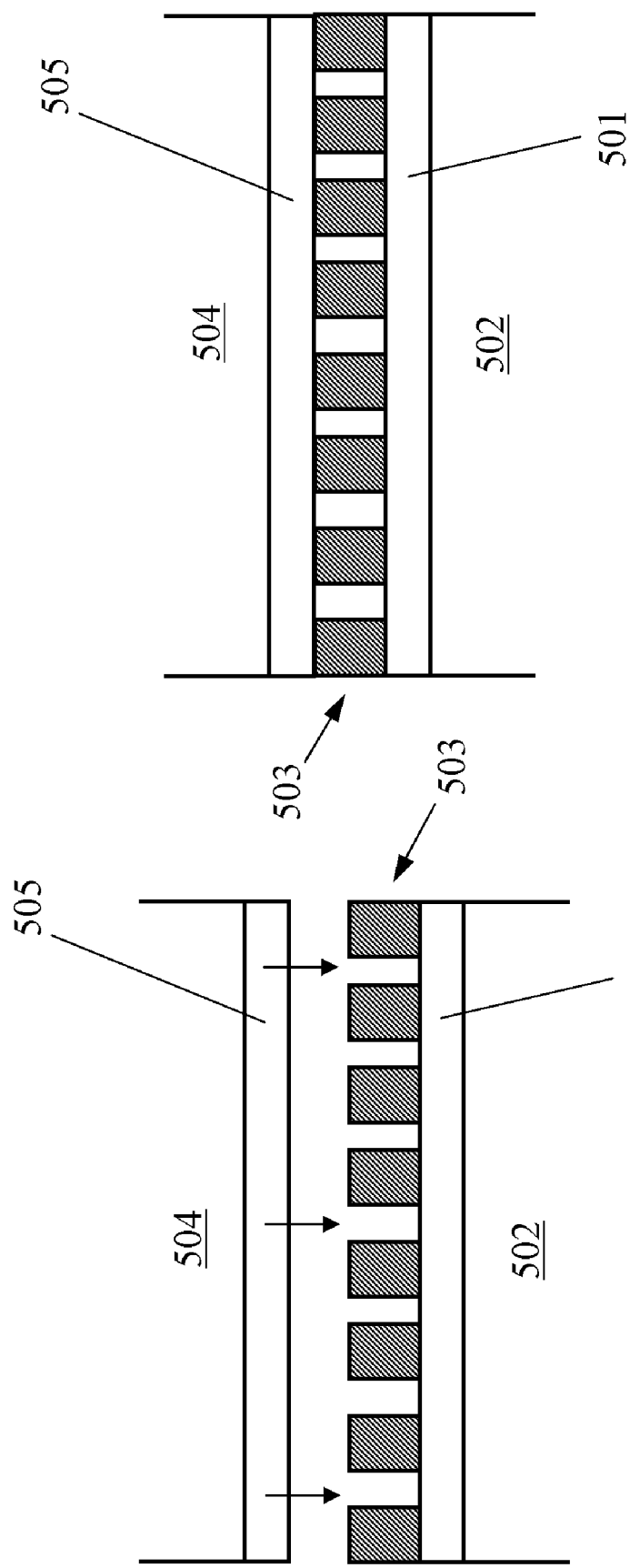

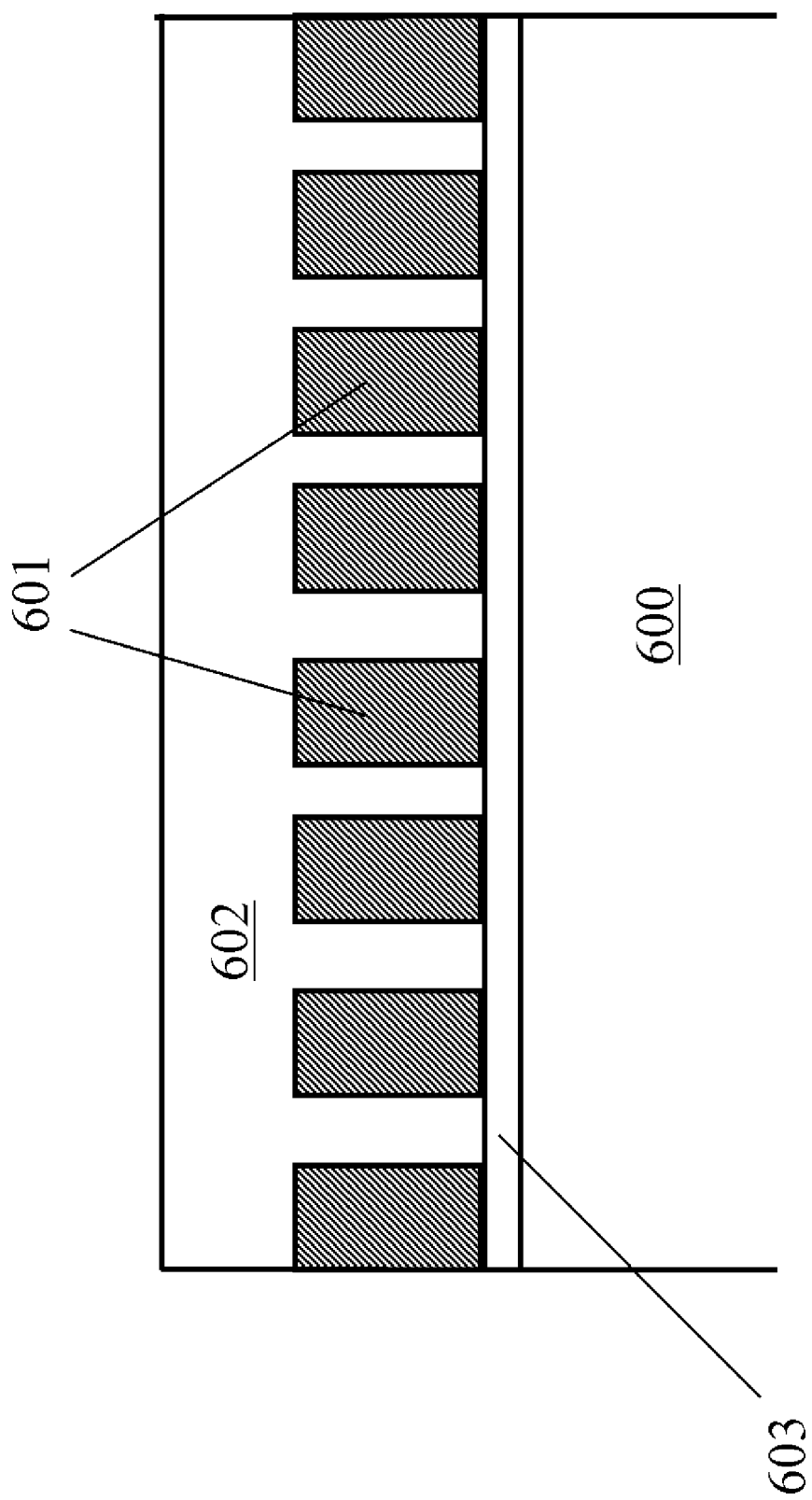

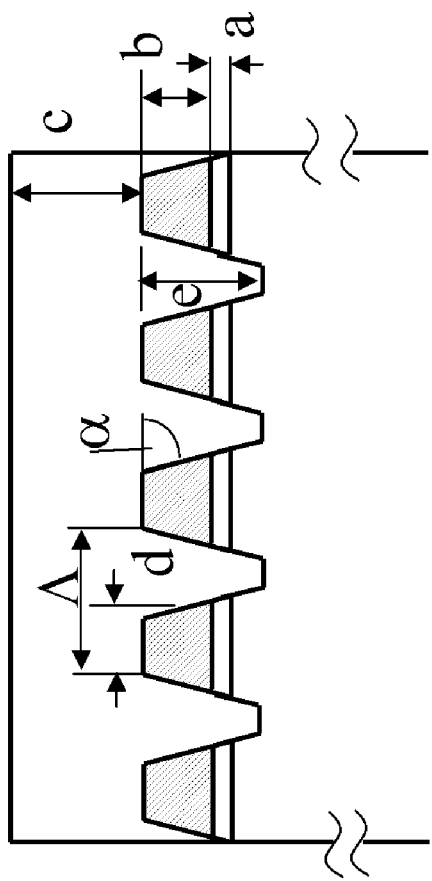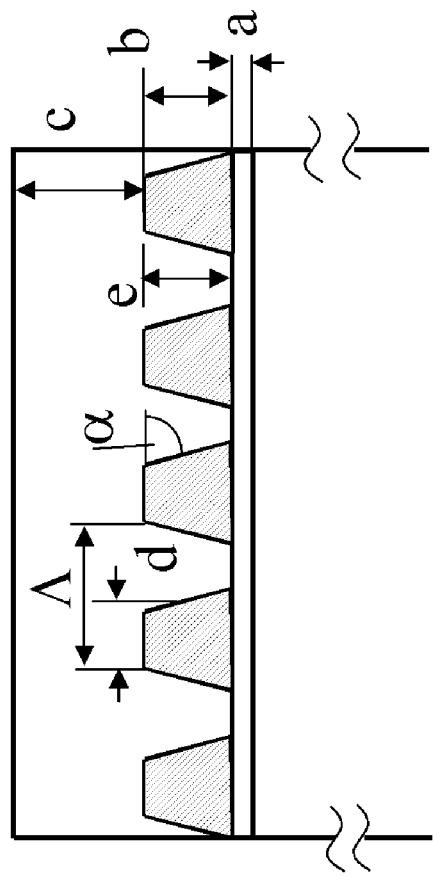
Fig. 11A
Fig. 11B

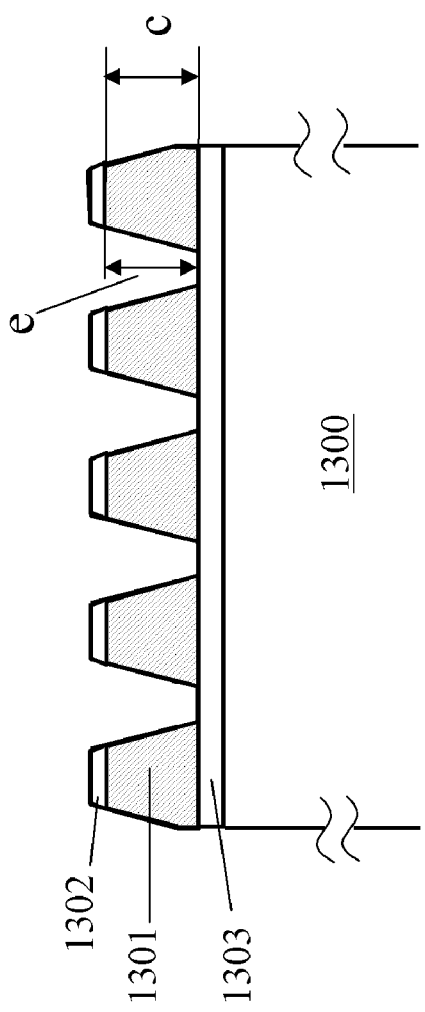
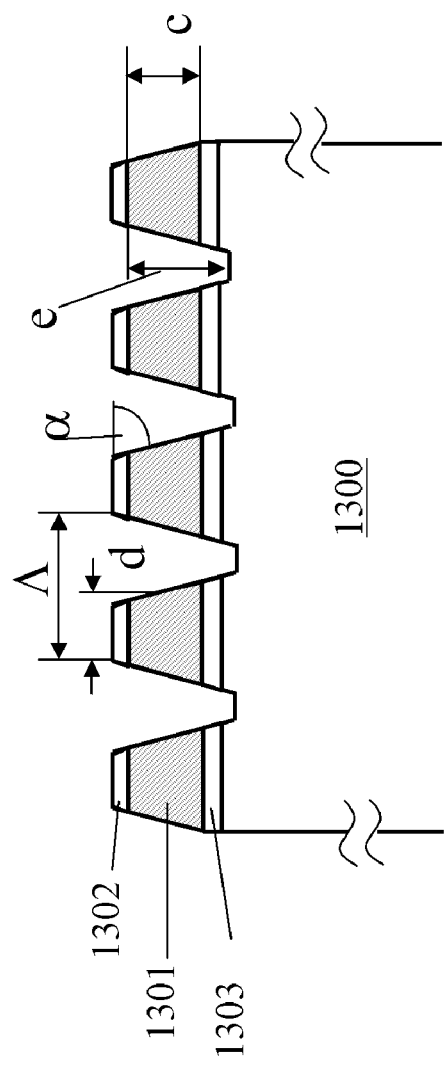
Fig. 13A
Fig. 13B

| Variable | Variable Change | minimum DE | maximum PDL | DE change | PDL change |
|---|---|---|---|---|---|
| Main layer thickness | plus 5 percent | 96.5 | 0.11 | 2 | 0.068 |
|  | minus 5 percent | 96 | 0.15 | 2.5 | 0.108 |
| Main layer RI | plus 2.5 percent | 96.5 | 0.14 | 2 | 0.098 |
|  | minus 2.5 percent | 97.5 | 0.22 | 1 | 0.178 |
| Duty Cycle/CD | plus 5 percent | 98 | 0.04 | 0.5 | -0.002 |
|  | minus 5 percent | 94.5 | 0.17 | 4 | 0.128 |
| Sidewall angle | plus 3 deg (88) | 97.5 | 0.07 | 1 | 0.028 |
|  | min 3 deg (82) | 98 | 0.04 | 0.5 | -0.002 |
| Etch Depth | plus 10 percent (150 nm into SiO2) |  |  | 98.5 | -0.042 |
|  | minus 10 percent (100 nm resid. SiOxyNitride) |  |  | 98.5 | -0.042 |
| Top layer thickness | plus 5 percent | 98 | 0.06 | 0.5 | 0.018 |
|  | minus 5 percent | 98 | 0.06 | 0.5 | 0.018 |
| Bottom layer thickness | plus 5 percent | 98 | 0.06 | 0.5 | 0.018 |
|  | minus 5 percent | 98 | 0.06 | 0.5 | 0.018 |
| Top layer thickness RI | plus 2.5 percent | 98 | 0.05 | 0.5 | 0.008 |
|  | minus 2.5 percent | 98 | 0.06 | 0.5 | 0.018 |
| Bottom layer RI | plus 2.5 percent | 98 | 0.07 | 0.5 | 0.028 |
|  | minus 2.5 percent | 97.5 | 0.08 | 1 | 0.038 |

Fig. 17

| Variable | Variable Change | minimum DE | maximum PDL | DE change | PDL change |
|---|---|---|---|---|---|
| Main layer thickness | plus 5 percent | 97 | 0.01 | -1 | -0.04 |
| | minus 5 percent | 97.5 | 0.05 | -0.5 | 0 |
| Main layer RI | plus 2.5 percent | 97 | 0.07 | -1 | 0.02 |
| | minus 2.5 percent | 96.5 | 0.1 | -1.5 | 0.05 |
| Duty Cycle/CD | plus 5 percent | 98 | 0.055 | 0 | 0.005 |
| | minus 5 percent | 95 | 0.14 | -3 | 0.09 |
| Sidewall angle | plus 3 deg (90) | 97 | 0.07 | -1 | 0.02 |
| | min 3 deg (84) | 95 | 0.17 | -3 | 0.12 |
| Etch Depth | plus 10 percent (150 nm into SiO2) | 96 | 0.06 | -2 | 0.01 |
| | minus 10 percent (140 nm residual SiOxyNi) | 96.5 | 0.02 | -1.5 | -0.03 |
| Top layer thickness | plus 5 percent | 96.5 | 0.1 | -1.5 | 0.05 |
| | minus 5 percent | 96.5 | 0.1 | -1.5 | 0.05 |
| Bottom layer thickness | plus 5 percent | 96.5 | 0.1 | -1.5 | 0.05 |
| | minus 5 percent | 96.5 | 0.11 | -1.5 | 0.06 |
| Top layer RI | plus 5 percent | 96.5 | 0.08 | -1.5 | 0.03 |
| | minus 5 percent | 96 | 0.09 | -2 | 0.04 |
| Bottom layer RI | plus 2.5 percent | 97 | 0.08 | -1 | 0.03 |
| | minus 2.5 percent | 96 | 0.12 | -2 | 0.07 |

Fig. 20

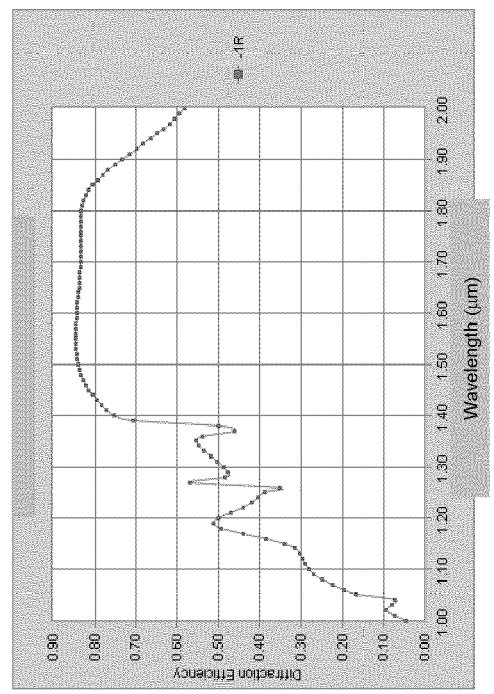
Fig. 27A
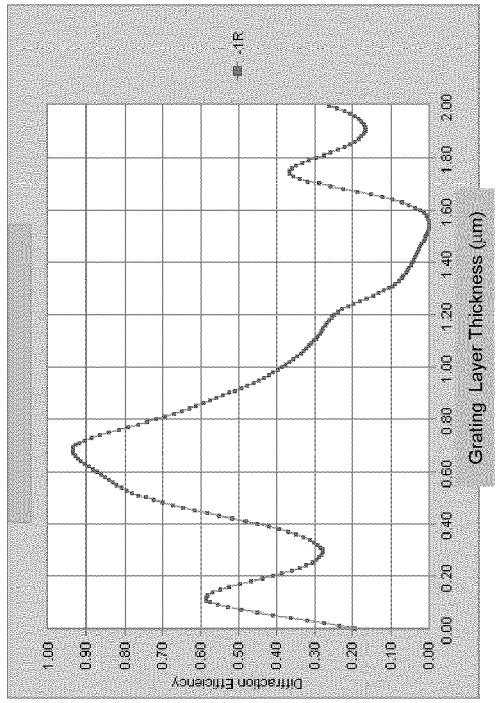
TE
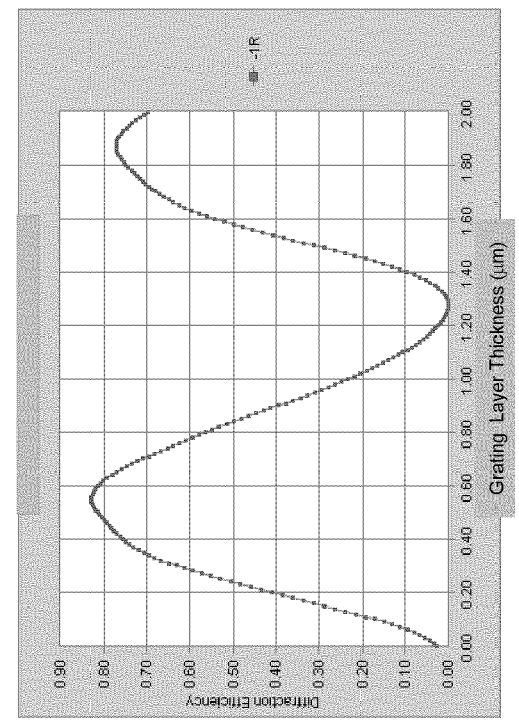
TM

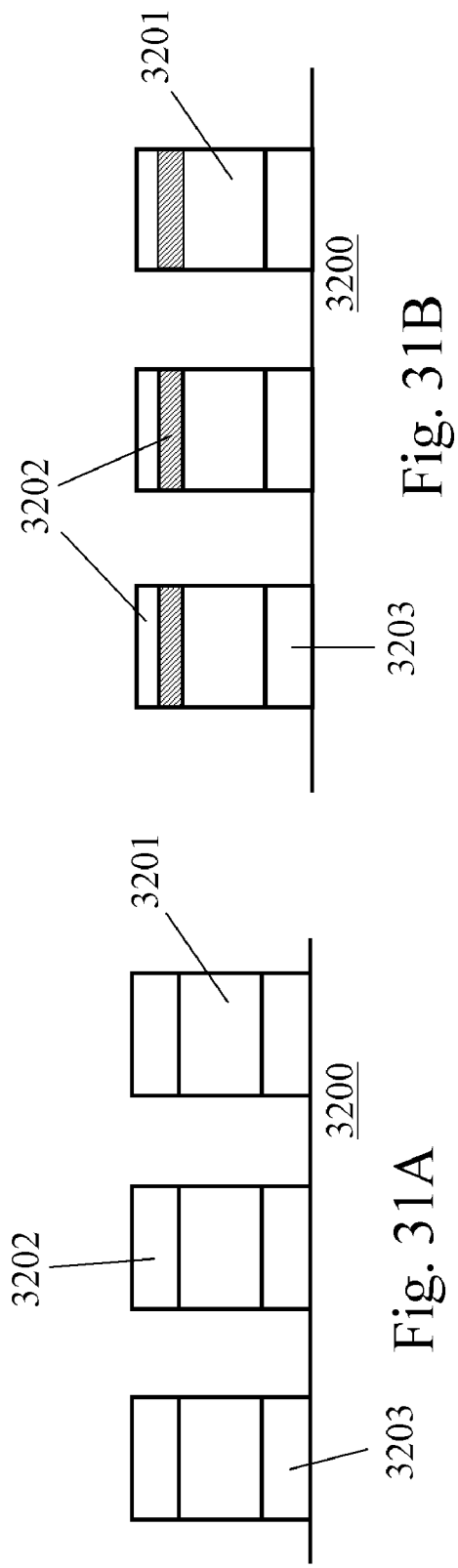

US 8,165,436 B2

HIGHLY EFFICIENT OPTICAL GRATINGS WITH REDUCED THICKNESS REQUIREMENTS AND IMPEDANCE-MATCHING LAYERS

BENEFIT CLAIMS TO RELATED APPLICATIONS

This application claims benefit of: (i) U.S. provisional App. No. 61/002,059 filed Nov. 5, 2007; (ii) U.S. provisional App. No. 61/005,647 filed Dec. 5, 2007; (iii) U.S. provisional App. No. 61/011,589 filed Jan. 18, 2008; (iv) U.S. provisional App. No. 61/068,544 filed Mar. 6, 2008; and (v) U.S. provisional App. No. 61/126,757 filed May 6, 2008. Each of said provisional applications is hereby incorporated by reference as if fully set forth herein.

BACKGROUND

The field of the present invention relates to optical gratings. In particular, highly efficient optical gratings are disclosed herein that include at least one impedance matching layer or are arranged to exhibit reduced polarization dependence.

A wide variety of optical gratings are available for diffracting optical signals, in transmission or in reflection. One particular example is disclosed by Wang et al ("Deep-etched high-density fused-silica transmission gratings with high efficiency at a wavelength of 1550 nm," Applied Optics, Vol 45 No 12 p 2567 (2006)). The optical grating disclosed therein comprises relatively deep etched grooves in a fused silica substrate (about 2.5 µm deep for maximum diffraction efficiency at 1550 nm). The optical gratings disclosed by Wang et al can be advantageously employed, for example, for dividing or combining optical signals of differing wavelengths in a dense wavelength division multiplexing (DWDM) optical telecommunications system.

It is desirable to provide efficient gratings with reduced thickness (i.e., etch depth) requirements. While the optical gratings disclosed by Wang et al can be highly efficient (calculated>95%, measured>87% for TE polarization), it is nevertheless desirable to provide optical gratings that exhibit increased efficiency, decreased polarization dependence, or decreased wavelength dependence. Such improved optical gratings would find wider applicability in a variety of telecommunications or other optical implementations.

SUMMARY

An optical grating comprising a grating layer and two surface layers, the layers being arranged with the grating layer between the surface layers. The grating layer comprises a set of multiple, discrete, elongated first grating regions that comprise a first dielectric material and are arranged with intervening elongated second grating regions. The bulk refractive index of the dielectric material of the first grating regions is larger than the bulk refractive index of the second grating regions. The first surface layer comprises a first impedance matching layer, and the second surface layer comprises either (i) a second impedance matching layer or (ii) a reflective layer. Each said impedance matching layer is arranged to reduce reflection of an optical signal transmitted through the corresponding surface of the grating layer, relative to reflection of the optical signal in the absence of said impedance matching layer.

Objects and advantages pertaining to optical gratings may become apparent upon referring to the exemplary embodiments illustrated in the drawings and disclosed in the following written description or appended claims.

BRIEF DESCRIPTION OF THE DRAWINGS

FIGS. 2A and 2B illustrate schematically low-index and high index optical modes, respectively, that propagate through an exemplary grating layer.

FIG. 4A is a schematic cross-sectional view of an exemplary optical transmission grating layer; FIG. 4D is a calculated plot of the corresponding diffraction efficiency versus grating layer thickness. FIG. 4B is a schematic cross-sectional view of an exemplary optical transmission grating layer with one impedance matching layer; FIG. 4E is a calculated plot of the corresponding diffraction efficiency versus grating layer thickness. FIG. 4C is a schematic cross-sectional view of an exemplary optical transmission grating layer with two impedance matching layers; FIG. 4F is a calculated plot of the corresponding diffraction efficiency versus grating layer thickness.

FIGS. 5A and 5B illustrate schematically assembly of an exemplary optical grating layer and an impedance matching layer.

FIG. 6 is a schematic cross-sectional view of an exemplary optical transmission grating with impedance matching layers.

FIGS. 11A and 11B are each schematic cross-sectional views of exemplary optical transmission gratings with impedance matching layers.

FIGS. 13A and 13B are each schematic cross-sectional view of exemplary optical transmission gratings with impedance matching layers.

FIG. 17 is a table illustrating the dependence of grating performance on fabrication tolerances for the exemplary optical grating of FIG. 14.

FIG. 20 is a table illustrating the dependence of grating performance on fabrication tolerances for the exemplary optical grating of FIG. 18.

FIGS. 27A and 27B are calculated plots of diffraction efficiency versus grating layer thickness for differing polarizations for an exemplary optical grating. FIG. 27C is a calculated plot of diffraction efficiency versus wavelength for an exemplary optical grating.

FIGS. 31A-31D are schematic cross-sectional views of exemplary optical gratings with impedance matching layers.

Figure 1A:
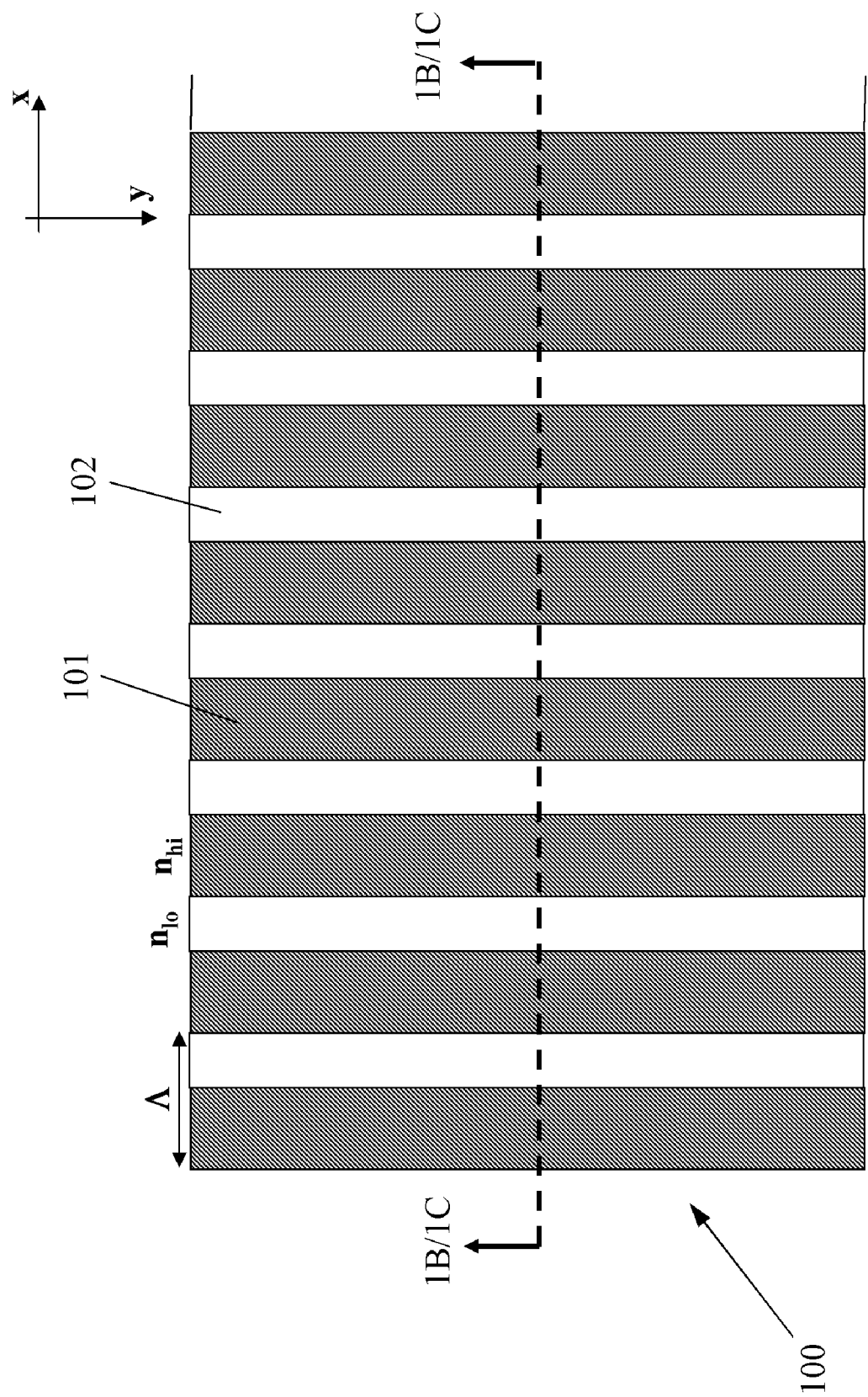
FIG. 1A is a schematic plan view of an exemplary optical grating layer.

It should be noted that the embodiments depicted in this disclosure are only shown schematically, and that not all the features may be shown in full detail or in proper proportion. Certain features or structures may be exaggerated relative to others for clarity. For example, the actual optical gratings depicted as having a handful of diffractive lines of ridges typical have hundreds or thousands of lines per millimeter. The number of lines is reduced in the drawings for clarity. It should be noted further that the embodiments shown are exemplary only, and should not be construed as specifically limiting the scope of the written description. It is intended that equivalents of the disclosed exemplary embodiments and methods shall fall within the scope of the present disclosure. It is intended that the disclosed exemplary embodiment, and equivalents thereof, may be modified while remaining within the scope of the present disclosure.

DETAILED DESCRIPTION OF EMBODIMENTS

Figure 1B:
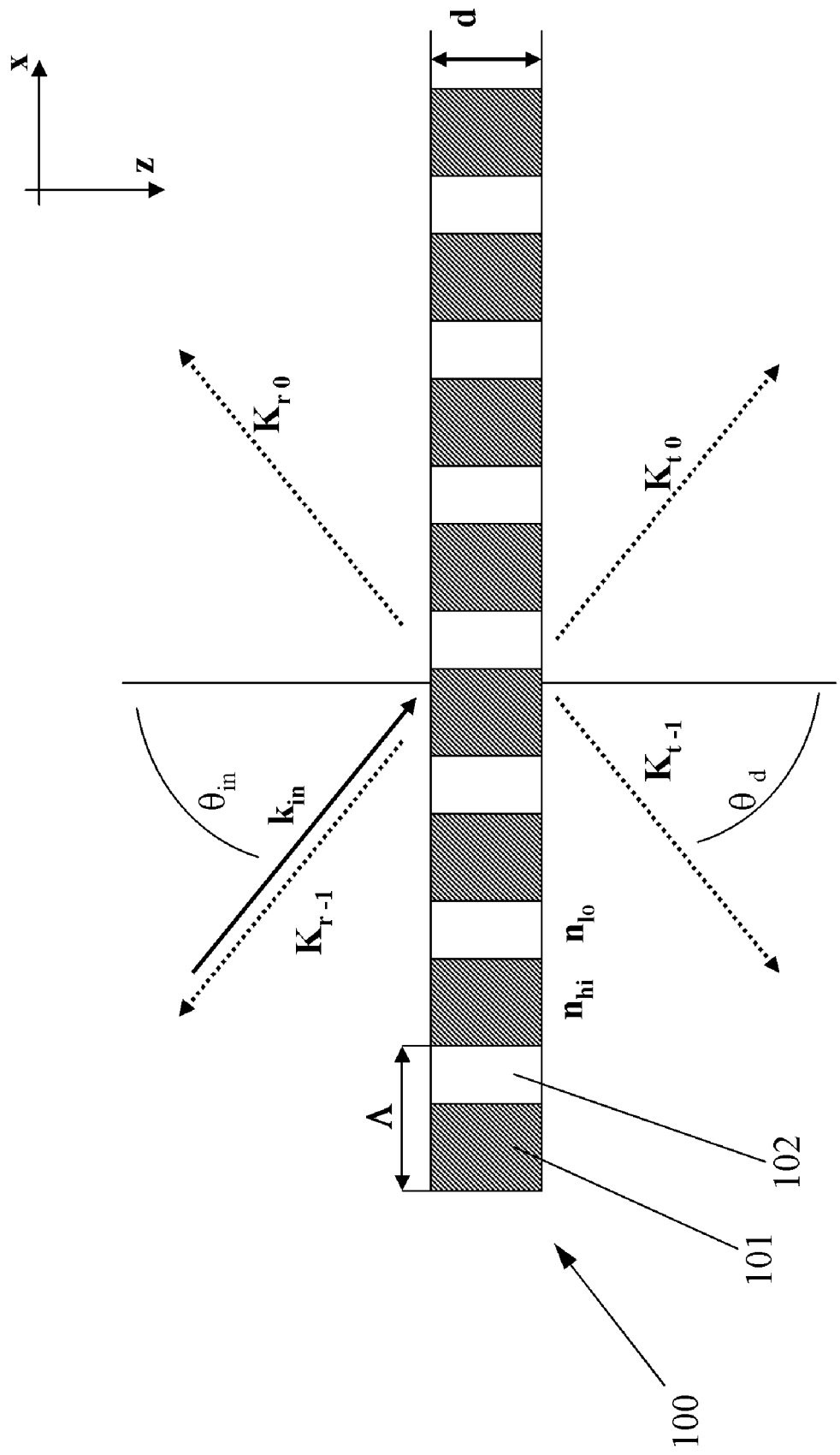
FIG. 1B is a schematic cross sectional view of the exemplary optical grating layer arranged as a transmission grating.
Figure 1C:
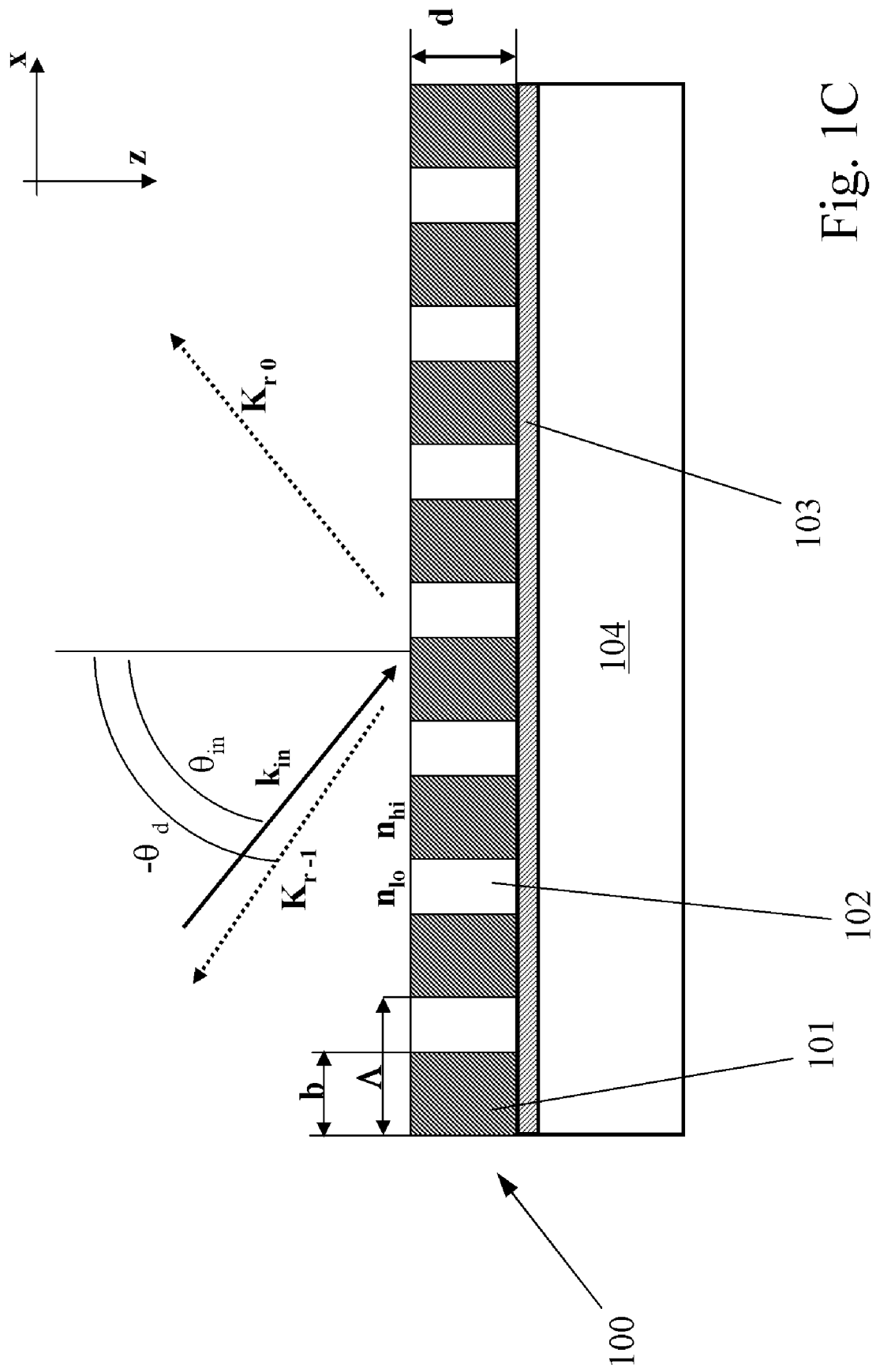
FIG. 1C is a schematic cross sectional view of the exemplary optical grating layer arranged with a reflecting layer as a reflection grating.

FIG. 1A is a schematic plan view of an exemplary grating layer 100 arranged in the xy-plane. Grating layer 100 comprises a set of multiple, discrete, elongated first grating regions 101 (i.e., the grating "lines" that run along the y-direction). The grating regions 101 comprise a first dielectric material of bulk index $n_{hi}$. The grating regions 101, or equivalently grating lines 101, are arranged with intervening elongated second grating regions 102 (i.e., the "spaces" between grating lines 101) having a bulk refractive index $n_{lo}$ that is lower than $n_{hi}$. The second grating regions 102 can be empty space or can be filled with air or other ambient atmosphere or inert gas (in which case $n_{lo}$ would be about equal to unity). Alternatively, the second grating regions 102 can 11 comprise a second dielectric material filling the spaces between the first grating regions 101. FIG. 1B is a schematic cross sectional view of grating layer 100 arranged as a transmission grating, while FIG. 1C is a schematic cross sectional view of grating layer 100 arranged as a reflection grating (with reflecting layer 103). The grating period (equivalently, the grating spacing) is $\Lambda$, the grating layer thickness is d, the width of the grating regions 101 is b, and the grating duty cycle is $f=b/\Lambda$. The grating wavevector is parallel to the x-direction. All of those grating parameters are defined locally, and can be constant over the entire grating layer 100 or can vary over the area of the grating layer 100. While the grating layer 100 has been characterized as being flat for convenience of the present disclosure, the principles disclosed can be generalized to curved grating layers as well.

To maximize diffraction efficiency into only one diffracted order, $\Lambda$ is typically chosen to be comparable to or shorter than the wavelength $\lambda$ of an optical signal incident on the grating layer, thereby limiting diffraction to only the first diffracted order. If the presence of multiple diffracted orders is acceptable, then larger grating periods can be employed. All of the dielectric materials employed are substantially transparent over at least a selected operational wavelength range. The operational wavelength range is typically in the visible or near infrared spectral range, although other spectral regions can be employed. Particular wavelength ranges of interest are 1525-1565 nm (ITU telecom C-band) and 1570-1620 nm (ITU telecom L-band), which are used in DWDM optical telecommunications systems. Any other selected operational wavelength range shall fall within the scope of the present disclosure or appended claims.

In FIG. 1B, the grating layer 100 is arranged as a transmission grating surrounded by air or other inert gas as adjacent materials. Those adjacent materials can be referred to as substrate or superstrate materials. Often a substrate other than air is employed for mechanical support during fabrication or use of the transmission grating. Suitable substrate materials include but are not limited to fused silica, borosilicate glass, borophosphate glass, soda lime glass, or polymer. A substrate material can also be employed as the dielectric material filling the second grating regions; a polymer may be particularly well suited for that purpose. Any substrate material used for a transmission grating must be substantially transparent over the operation wavelength range.

In FIG. 1B, an optical signal with wave vector $k_{in}$ is incident on the grating layer 100. In this example the optical signal's incident angle $\theta_{in}$ (with respect to the grating layer normal) is chosen so that the magnitude of the incident signal's wavevector component along the x-axis is about equal to half of the grating wavevector magnitude. That geometry results in a reflected diffracted wave with wavevector $k_{r-1}$ that is collinear but anti-parallel with the input signal (reflected negative first order diffracted signal), and a transmitted diffracted wave with wave vector $k_{t-1}$ (transmitted negative first order diffracted signal) that propagates at an angle $\theta_d$ with respect to the grating layer normal, where $\theta_{in} \neq \theta_d$. Wavevectors $k_{r0}$ and $k_{t0}$ denote the specularly reflected and directly transmitted signals (zeroth order diffracted signals).

The diffraction efficiency of the transmitted negative first order diffracted signal depends on the thickness d of the grating as well as the bulk refractive indices $n_{hi}$ and $n_{lo}$ of the first and second grating regions 101 and 102, respectively. For appropriately chosen grating thickness and refractive indices, greater than 90% of the incident optical signal can be diffracted into the first transmitted diffracted order. Additionally, the duty cycle of the grating can be optimized along with the bulk indices and thickness to reduce the polarization-dependence of the diffraction efficiency into the first diffracted order, as described further below.

The grating layer 100 of FIG. 1B can be characterized as a periodic slab waveguide, and the optical signal incident on the grating layer 100 couples into bound optical modes that propagate through the grating layer 100 in the z-direction. The electric field amplitudes of the two bound grating modes of interest are depicted in FIGS. 2A and 2B. In FIG. 2A, a first (or "fast") grating mode 201 has a periodically varying field amplitude with its intensity substantially confined to the low refractive index regions of the grating, i.e., electric field maxima are located within regions of refractive index $n_{lo}$ and electric field nodes are located within regions of refractive index $n_{hi}$. In FIG. 2B, a second (or "slow") grating mode 202 is shown that has a periodically varying field amplitude with its intensity substantially confined to the high refractive index regions of the grating, i.e., electric field maxima are located within regions of refractive index $n_{hi}$ and electric field nodes are located within regions of refractive index $n_{lo}$. The "slow" grating mode propagates with a phase velocity that is close to $c/n_{hi}$ (modal index close to $n_{hi}$), and the "fast" grating mode propagates with a phase velocity that is close to $c/n_{lo}$ (modal index close to $n_{lo}$). The precise phase velocities (or modal indices) of the fast and slow modes of the grating layer can be obtained by employing analytic or numeric solution of the Helmholtz equation with periodic boundary conditions imposed by the grating layer dimensions $\Lambda$ and f. This procedure and relevant means such as mode solver software are conventionally employed for designing or characterizing diffraction gratings, optical waveguides, or other optical components or structures.

Figure 3:
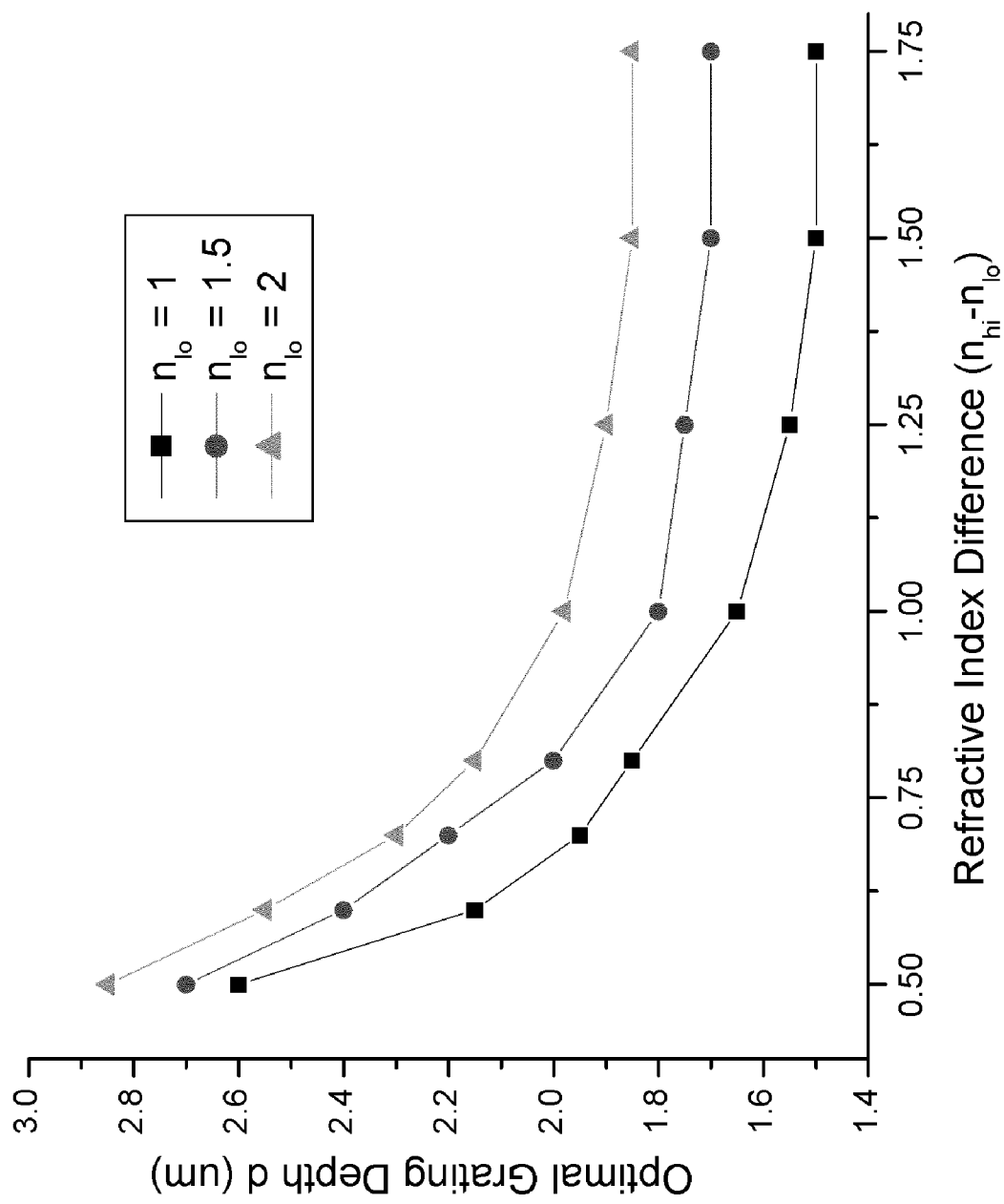
FIG. 3 is a calculated plot of optimal grating depth versus refractive index difference between regions of a grating layer of an exemplary optical transmission grating.

The diffraction efficiency of the negative first transmitted diffracted order is affected by the phase difference between fast and slow modes that is accrued after propagation through the grating layer thickness d. If that phase difference is about equal to $\pi$ (or another odd multiple of $\pi$) at a specified wavelength of interest, maximum diffraction efficiency into the first transmitted order is achieved for that grating layer configuration. The magnitude of the phase difference is related to the product of grating thickness d and refractive index difference. A larger index contrast between $n_{lo}$ and $n_{hi}$ enables a smaller grating layer thickness d to be employed to achieve a given accrued phase difference. This is illustrated in FIG. 3, where the grating thickness required for optimal diffraction efficiency (i.e., an accrued phase difference of $\pi$) is plotted as a function of index difference $\Delta = (n_{hi} - n_{lo})$, which is varied for this plot by varying $n_{hi}$ while $n_{lo}$ remains constant. The graph shows plots for $n_{lo} = 1.0$, 1.5, and 2.0, roughly corresponding to air, glass or silica, and silicon oxynitride filling the second grating regions 102 of grating layer 100. For the plots of FIG. 3, a TE-polarized input signal with $\lambda = 1545$ nm incident at $\theta_{in} = 45.565°$ was used. FIG. 3 demonstrates that optimal diffraction efficiency can be achieved for relatively thin grating layers for index contrast>0.5. For example, a grating layer comprising silicon oxynitride ($n_{hi} = 2.0$) etched to form grating regions 101 with grating regions 102 left unfilled ($n_{lo} = 1.0$) yields an optimal grating thickness of only 1.7 μm. FIG. 3 indicates that the use of high index materials (n>1.5) and an index contrast>0.5 can yield high diffraction efficiency with thinner grating layers than can be achieved with lower-index materials such as glass.

As described above, to achieve high diffraction efficiency the optical phase difference between fast and slow modes accrued in propagating through the grating layer should be about equal to an odd multiple of $\pi$. For a given wavelength that phase difference depends on both the grating layer thickness and the difference between the respective modal indices. Those indices, (and thus possibly their difference) are often different for the two principal polarizations states (TE and TM). To obtain substantially polarization independent behavior, the modal index difference for both principal polarizations should be about equal.

For a given grating mode (propagating through the grating layer), the modal index depends on the bulk refractive indices of the first and second grating regions and the specific morphology of the grating layer. For a grating layer comprising regions having simple rectangular cross-sections, the morphological parameters that affect the modal index is the grating's duty cycle (for a given grating spacing). The specific dependence of the modal indices on the grating duty cycle can be obtained by employing analytic or numeric solution of the Helmholtz equation with periodic boundary conditions imposed by the grating layer dimensions $\Lambda$ and f. This procedure and relevant means such as mode solver software are conventionally employed for designing or characterizing diffraction gratings, optical waveguides, or other optical components or structures.

Two limiting cases illustrate the duty cycle's influence on the modal indices of fast and slow modes. For small duty cycles (f<0.1), the modal indices will be close to the refractive index of the second grating region because most of the grating will consist of second grating region low index material. Likewise, for high duty cycles (f>0.9), the modal indices for fast and slow modes will be close to the refractive index of the high index first grating regions. The difference between modal indices will typically be the largest close to a duty cycle of about 0.5 and smaller for very small and very large duty cycles.

To obtain substantially polarization independent high grating efficiency, a duty cycle should be found for which the modal index difference is substantially similar for both polarizations. Besides aforementioned analytical tools, diffractive optics software or grating software, such as GSOLVER©, can be used to determine this optimal duty cycle. For example, for a grating layer consisting of chosen first and second grating region materials, the negative first order diffraction efficiency can be calculated, as a function of layer thickness and for both polarizations, for a given angle of incidence, a given center wavelength, and a minimum selected duty cycle (e.g., starting with the smallest duty cycle that is consistent with the resolution of the chosen fabrication method, such as the minimum lithographic resolution, for example). The grating layer thickness at which maximal diffraction efficiency occurs for each polarization is then recorded. The duty cycle is then incrementally increased and the calculation is repeated until a duty cycle is identified for which the peaks of maximal efficiency occur for about the same grating layer thickness and are about the same height for both polarizations. A grating having that grating duty cycle and grating layer thickness will exhibit nearly polarization independent behavior.

Alternatively, a grating duty cycle can be selected for which the maximal efficiency for each polarization occurs at slightly different thicknesses (for the given center wavelength and angle of incidence). If a grating is designed and fabricated with a duty cycle and a thickness corresponding to the point where the negative first order diffraction efficiency is the same for both polarizations at the given center wavelength and angle of incidence (i.e., the crossing point in between the peaks of the efficiency versus thickness plots of the two polarizations), the resulting grating will typically exhibit diffraction efficiency at that wavelength that is substantially polarization independent, i.e., zero polarization dependent loss (PDL). That thickness is typically near the average of the thicknesses where maximal efficiency occurs for the two principal polarizations.

When using high refractive index layers and large index differentials to create a grating layer, it can be advantageous to impedance match the grating layer to the adjacent media (i.e., surrounding superstrate and substrate). In FIG. 4A, a layer of titanium dioxide ($n_{hi}$=2.2) is etched to yield a grating with period Λ=1063.8 nm and a duty cycle of 54%. FIG. 4D shows the calculated diffraction efficiency of the resulting grating layer 401 as a function of grating layer thickness when no fill material is used in the second grating regions ($n_{lo}$=1.0). In each of FIGS. 4D-4F, the two main peaks correspond to a phase difference between two mode propagating through the grating layer about equal to an odd multiple of π, while the troughs between those peaks correspond to a phase difference about equal to an even multiple of π. The diffraction efficiency curve of FIG. 4D exhibits significant oscillations superimposed on the two main peaks as the grating layer thickness varies. It is speculated that these arise from resonant behavior of the internal grating modes reflected at the surfaces of grating layer 401. This oscillatory behavior requires tight tolerances on the etch depth to yield a grating maximally efficient at a particular design wavelength, which is problematic since the depth of a typical etch process is controlled by timing and is often no more accurate than about 10% of the target depth.

The grating layer 401 can be impedance matched to the adjacent medium by an impedance matching layer on the corresponding surface of the grating layer 401. Such an impedance matching layer tends to suppress the oscillatory behavior shown in FIG. 4D. Impedance matching can be provided by an anti-reflection layer between the grating layer and the adjacent medium. In FIG. 4B, a 340-nm thick impedance matching layer 402 is provided on grating layer 401. The bulk refractive index of impedance matching layer 402 in this example is n=1.34 (close to that of $MgF_2$). FIG. 4E shows the calculated diffraction efficiency of the structure of FIG. 4B as a function of grating layer thickness, in which the oscillations are substantially reduced. In FIG. 4C, a second impedance matching layer 403, having the same thickness and index as layer 402, is provided on the other surface of grating layer 401. FIG. 4F shows the calculated diffraction efficiency of the structure of FIG. 4C as a function of grating layer thickness, in which the oscillations have been substantially eliminated. The structure of FIG. 4C exhibits>90% diffraction efficiency for both TE and TM input optical signals over a wavelength range of at least 1525 to 1565 nm.

The impedance matching layers can be designed, i.e., suitable thickness and bulk refractive index can be chosen, using the Fresnel equations to produce a single-layer, quarter-wave antireflection coating. The thickness of the layer is designed so that an optical phase difference of π+2Nπ (i.e., an odd multiple of π where N is an integer) arises between the reflection of an optical signal from the first and second surfaces of the layer at a selected wavelength and a selected angle of incidence. Smaller values of N provide for impedance matching that is effective over a wider spectral range. Larger values of N provide more effectively averaging over the spatially varying index of the grating layer (to a first approximation, an average of $n_{lo}$ and $n_{hi}$, weighted by the duty cycle). The refractive index of the impedance matching layer is chosen, for the selected wavelength and angle of incidence, so that the magnitudes of the Fresnel reflection coefficients for reflection from the two surfaces of the impedance matching layer are equal or as closely equal as practicable given the available, compatible materials. Analytical or numerical calculations can be performed to approximate or refine the optimum parameters of the impedance matching layer.

One example of fabricating an optical grating with two impedance matching layers is illustrated schematically in FIGS. 5A and 5B. First, an impedance matching layer 501 is deposited on a suitable substrate 502. Then a transmission grating layer 503 is formed by depositing a high index layer on impedance matching layer 501 and then forming the grating layer 503, e.g., by photolithography and etching. Third, a second impedance matching layer 505 is formed on a second substrate 504, which is then pressed onto the grating layer 503 and held in place by optical contacting. To further secure the layers, the edge of the optical grating can be coated or sealed with epoxy or other suitable adhesive. Alternatively, an epoxy or other optical adhesive or optical cement can be employed to fill the etched spaces in the high index grating material and also serve to hold the impedance matching layer 505 and substrate 505 in place. If such a space-filling adhesive is used, the impedance matching layer 505 is optimized based on the average index of the grating layer 503 with its second grating regions filled with the adhesive.

A specific exemplary embodiment is shown in FIG. 6 and is designed for an incidence angle of 50°. The transmission grating is formed on a fused silica substrate 600 (n=1.446). The grating layer comprises a 2-μm thick layer 601 of $CeO_2$ (n=2.2) that is etched through and then filled with borophosphate glass 602 (n=1.446). Layer 602 functions both as an impedance matching layer and the dielectric material filling the second grating regions between the first regions 601. The thickness of layer 602 beyond the top of layer 601 is 1.57 μm, and serves as the impedance matching layer. The grating period is 1.035 μm and the duty cycle 60%, i.e., the $CeO_2$ segment width is 621 nm and the glass-element width is 414 nm. The grating structure rests on a 200 nm thick layer 603 of $Al_2O_3$ (sapphire, n=1.7) that serves as a second impedance matching layer. The grating is optimized for operation as a demultiplexer in the ITU telecom C-band, 1525-1565 nm. The device shown in FIG. 6 can be fabricated using various suitable methods known in the semiconductor industry including but not limited to the techniques of electron-beam vacuum deposition, photolithography, reactive-ion etch, and thermal anneal. Note that any of the specific aforementioned materials can be replaced by others of similar optical properties, i.e., refractive index, transparency, etc.

Figure 7:
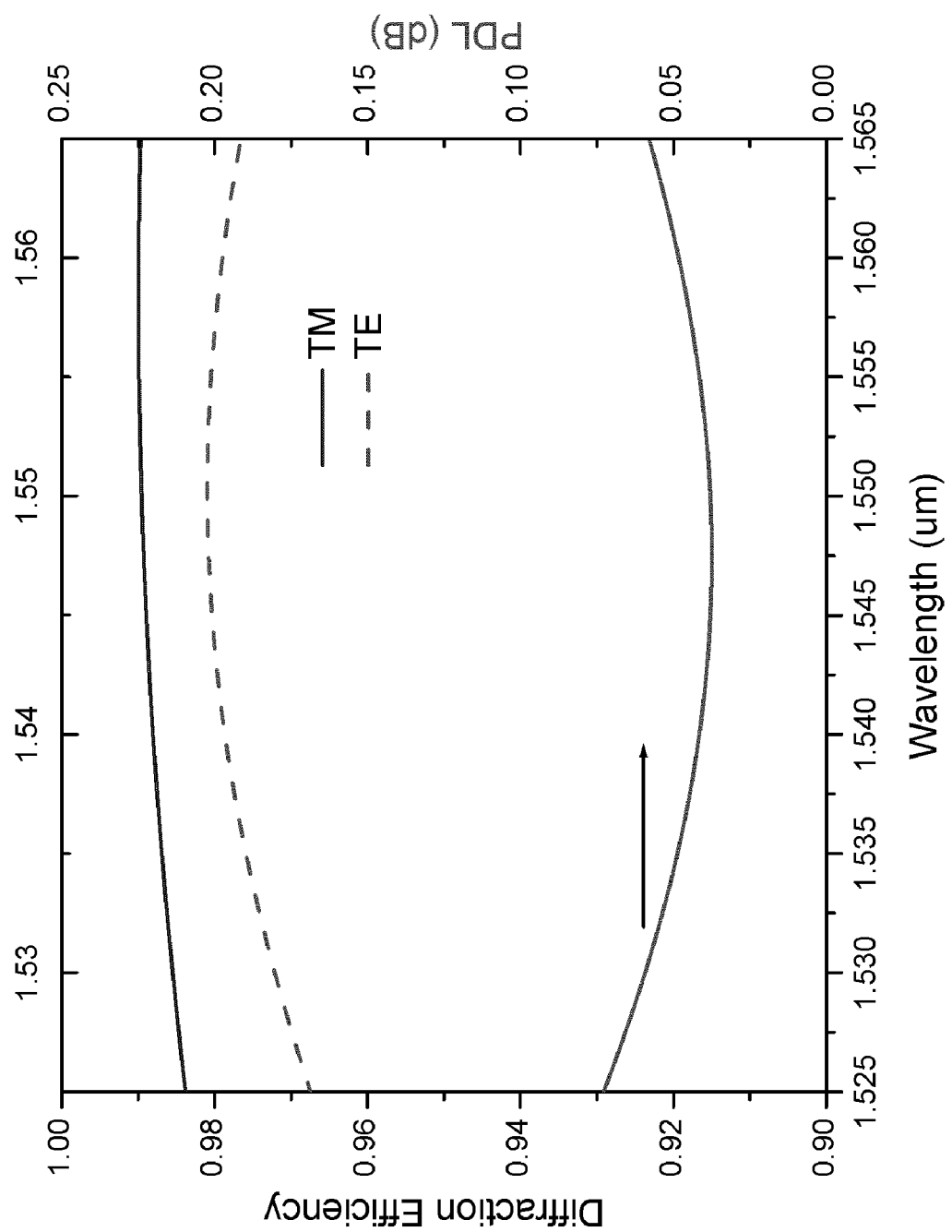
FIG. 7 is a calculated plot of diffraction efficiency and polarization dependent loss (PDL) versus wavelength for one arrangement of the exemplary optical grating of FIG. 6.

FIG. 7 shows the calculated diffraction efficiency of the −1 transmitted order ($t_{-1}$ in the geometry of FIG. 1B) for TE-polarized (dashed line) and TM-polarized (solid line) input optical signals at an incidence angle of 50°, which is approximately the Littrow condition for the center of the wavelength range shown in the plot. Both TE- and TM-polarized input optical signals are diffracted with significantly better than 90% diffraction efficiency over a wavelength range of 1525-1565 nm. The polarization-dependent loss (PDL), i.e., the efficiency difference between the two polarizations, is well below 0.25 dB across that range. Such operational performance is highly desirable for devices employed in DWDM telecommunications systems, such as static or reconfigurable optical add-drop multiplexers or optical switches.

Figure 8B:
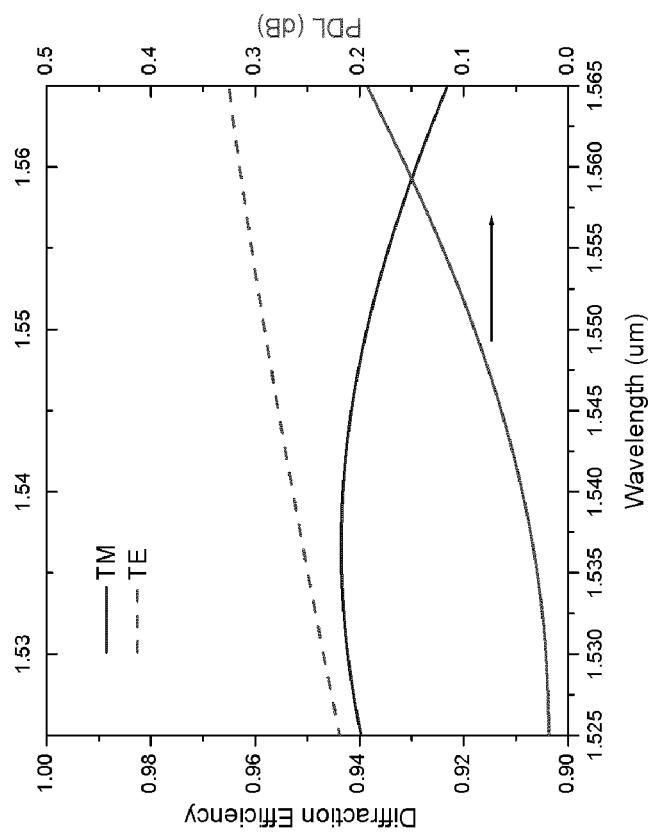
FIGS. 8A and 8B are calculated plots of diffraction efficiency and polarization dependent loss (PDL) versus wavelength for alternative arrangements of the exemplary optical grating of FIG. 6.
Figure 8A:
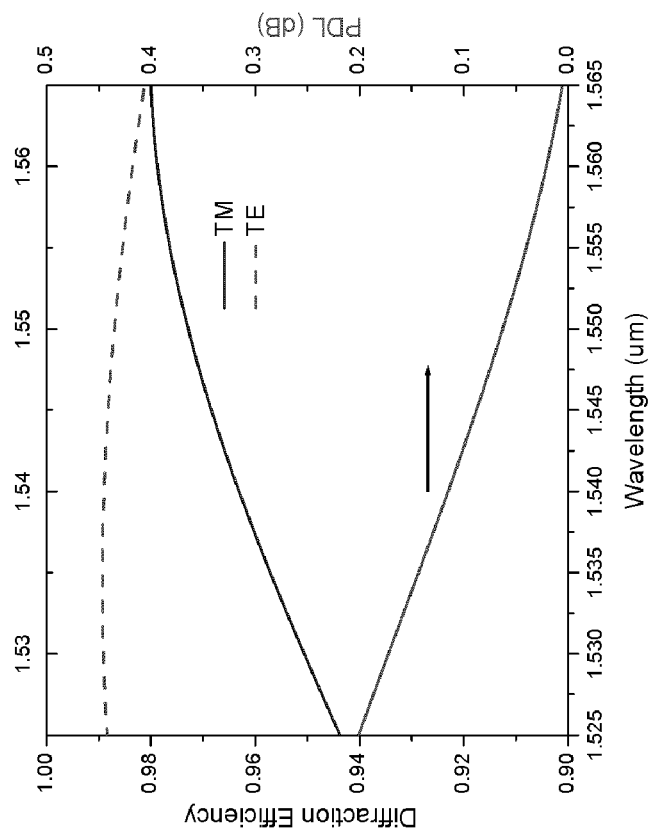

Grating performance similar to that shown in FIG. 7, i.e., >90% diffraction efficiency for both TE and TM input and <0.25 dB PDL from 1525 nm to 1565 nm, is still obtained even when operational or dimensional parameters deviate somewhat from the specific values given above. For example, FIGS. 8A and 8B show that the specified performance is obtained for incidence angles of 45° and 55°, respectively. Detailed simulation studies indicate that grating depth, duty cycle, and the thickness of layer 603 can deviate from the specific values of FIG. 6 by about ±10% and the target performance of >90% diffraction efficiency for both TE and TM input and <0.25 dB PDL is still obtained.

Figure 9:
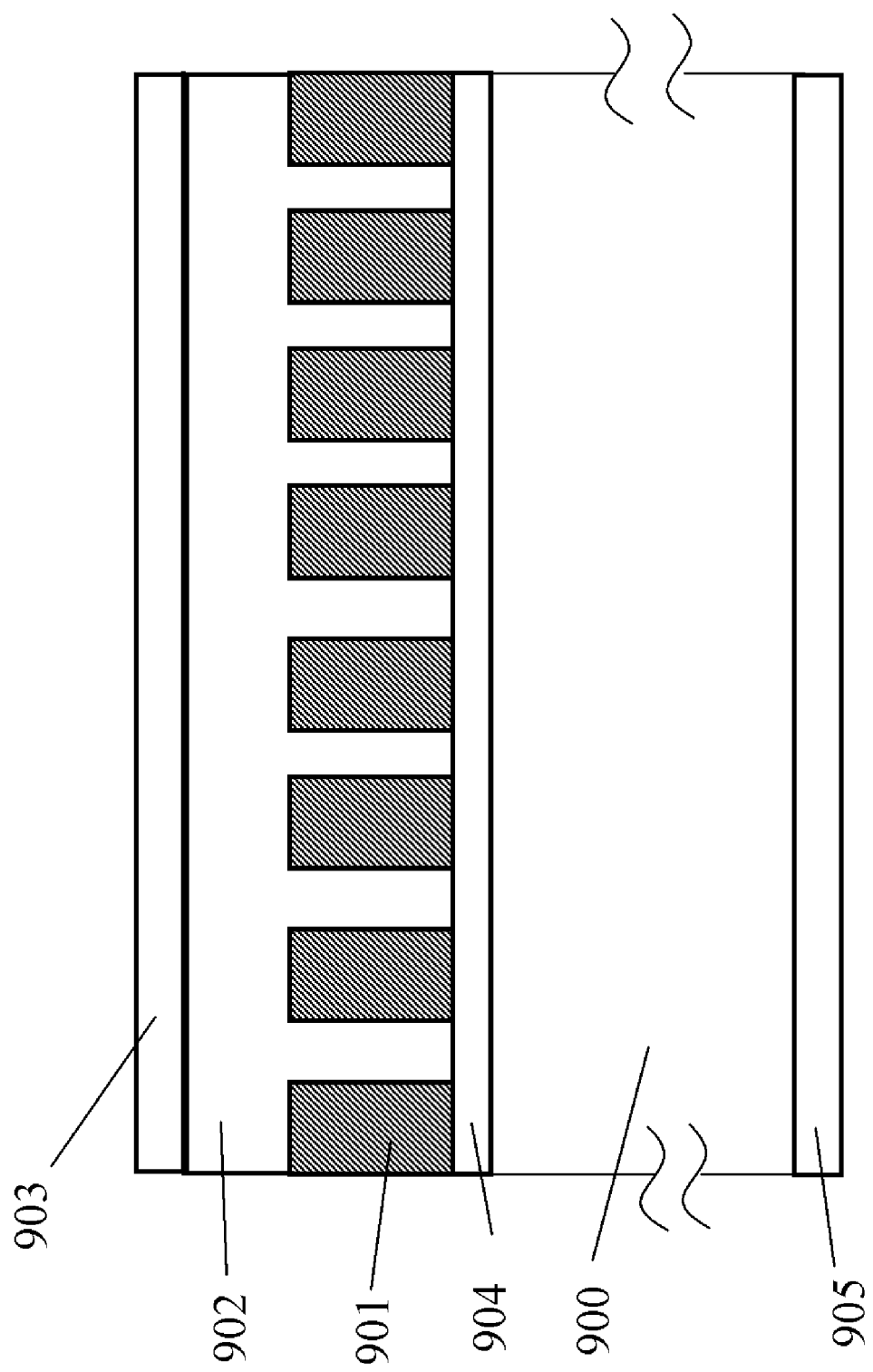
FIG. 9 is a schematic cross-sectional view of an exemplary optical transmission grating with impedance matching layers.

Another exemplary embodiment is shown in FIG. 9. It comprises a fused silica substrate 900 (n=1.446), a 2-μm-thick layer 901 of $TiO_2$ (n=2.2) that is etched and filled with borophosphate glass 902. The thickness of layer 902 beyond the top of layer 901 is 1.5 μm. Layer 902 is coated with an anti-reflection coating 903 optimized to minimize reflection for light incident at 45.565°. The grating period is 1.0638 μm and its duty cycle 60%, i.e., the $TiO_2$ segment width is 638 nm and the $SiO_2$-element width is 425 nm. Layer 902 functions both as impedance matching layer as well as to fill the spaces in grating layer 901. The grating layer 901 rests on a 240 nm thick layer 904 of silicon oxynitride (n=1.77) that acts as an impedance matching layer. The bottom of substrate 900 is also antireflection coated with coating 905. The grating is optimized for operation as a demultiplexer in the ITU telecom C-band, 1525-1565 nm, and exhibits performance characteristics similar to those shown in FIGS. 7, 8A, and 8B.

Generally, operationally acceptable grating performance can include performance in terms of diffraction efficiency and polarization-dependent loss such as that shown in FIGS. 7, 8A, and 8B, but should not be viewed as limited to such values. Rather, different optical grating applications may have more or less stringent requirements for grating performance and the term operationally acceptable performance is defined in the context of the relevant application.

Figure 10:
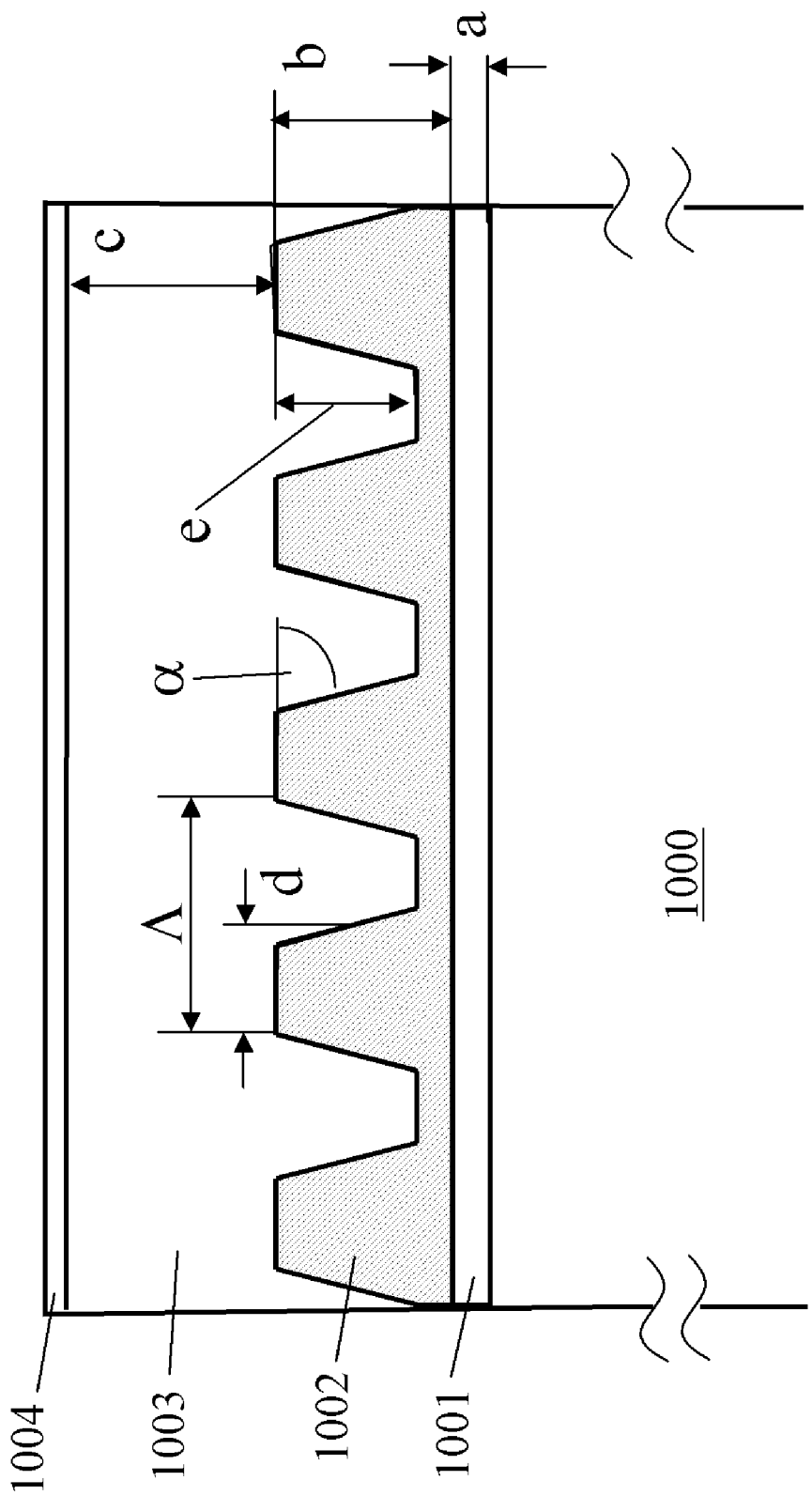
FIG. 10 is a schematic cross-sectional view of an exemplary optical transmission grating with impedance matching layers.

Another exemplary embodiment, optimized for an incidence angle of 500, is shown in FIG. 10. Substrate 1000 comprises fused silica or a similar material (n=1.446). A 2.2 μm (dimension b) thick layer 1002 of substantially transparent dielectric material has refractive index n=2.2 and is etched 2 μm deep (dimension e) and filled with a second material 1003 with an index of 1.446 such as boron phosphorus-doped silica glass. The thickness c of layer 1003 beyond the top of layer 1002 is 0.9 μm (not shown to scale) and acts as an impedance matching layer. Layer 1003 is coated with an anti-reflection coating 1004 optimized to minimize reflection for light incident at 50°. Since the reflection coefficient for p-polarized input at the interface of layer 1003 to air is smaller than that for s-polarized light (due to the incidence angle being close to Brewster's angle) it may be advantageous to optimize the antireflection layer 1004 minimize the reflection of s-polarized light. The grating period is 1.035 μm and the duty is cycle 60%, i.e., dimension d (defined for a grating ridge with non-vertical sidewalls as the width of the ridge at half of its height) is 620 nm. The grating layer 1002 rests on a layer 1001 (a=230 nm thick) with refractive index n=1.7. Layer 1001 can comprise sapphire deposited by conventional methods, but other optical materials of similar refractive index and properties can also be employed to yield operationally acceptable performance. The bottom of substrate 1000 can be antireflection coated (not shown). The grating is optimized for operation as a demultiplexer in the ITU telecom C-band, 1525-1565 nm, and exhibits performance characteristics similar to those shown in FIGS. 7, 8A, and 8B. Other application areas, for this and other disclosed embodiments, can include optical channel monitoring, multiplexing and non-telecom functions such as spectroscopy.

Optimization of the grating layer thickness for both polarizations states is described above, as well as differing criteria that can be employed for selecting an optimum combination of grating layer thickness and duty cycle to achieve desired performance of the resulting grating. In a similar fashion, impedance matching layers can be optimized for one or the other polarization states, or a compromise can be selected that provides desired grating performance over a range of wavelengths or for differing polarization states. In one example, an index and thickness for an impedance matching layer can be selected that minimizes reflection of one polarization state from the corresponding surface of the grating layer. Typically, the s-polarization state would be selected for such optimization, since that polarization state typically exhibits higher reflectivity from an interface than the p-polarization state. In another example, the impedance matching layer index and thickness can be selected to minimize reflection of unpolarized light. In another example, the thickness and index of the impedance matching layer can be selected that is not optimized for any particular polarization state, but that reduces or minimizes variation of grating performance between differing polarization states.

In a further example of optimization of an optical grating, thicknesses of the grating layer and impedance matching layers, determined for each layer individually as described elsewhere herein, can be varied from those predetermined values to alter the overall performance of the resulting optical grating. For example, the grating layer thickness can differ from that determined by maximizing its diffraction efficiency and the impedance matching layer thicknesses can differ from those optimized to minimize their reflectivities in a way that reduces or minimizes variation of the grating performance with respect to wavelength or polarization state. Those and many other "global" optimization or design schemes shall fall within the scope of the present disclosure or appended claims.

Some exemplary embodiments disclosed herein are shown having grating structures with vertical sidewalls. However, gratings structures having non-vertical sidewalls can also yield operationally acceptable performance. For example, in the exemplary embodiment of FIG. 10, a sidewall angle in the range α=84-900 yields optical grating performance wherein both s- and p-polarized input are diffracted into the first order with more than 90% efficiency and the polarization-dependent loss is less than 0.25 dB (for angles of incidence 50°±5°).

Additional exemplary embodiments are shown in FIGS. 11A and 11B. All dimensions, materials, refractive indices and other optical properties are the same as those of FIG. 10, except for the thickness dimension b and etch depth e. For both FIGS. 11A and 11B, b=2 μm. In FIG. 11A, the etch depth e>2.23 μm, i.e., both the grating layer and the lower impedance matching layer are etched through. In FIG. 11B, the etch depth e=2.0 μm, i.e., only the grating layer is etched. Per simulation, the embodiments of FIGS. 11A and 11B yield greater than 90% efficiency for both s- and p-polarized input and the polarization-dependent loss will below than 0.25 dB (for angles of incidence 50±5°) for sidewall angle in the range α=81-90° (FIG. 11A) and α=84-90° (FIG. 11B), respectively.

Figure 12:
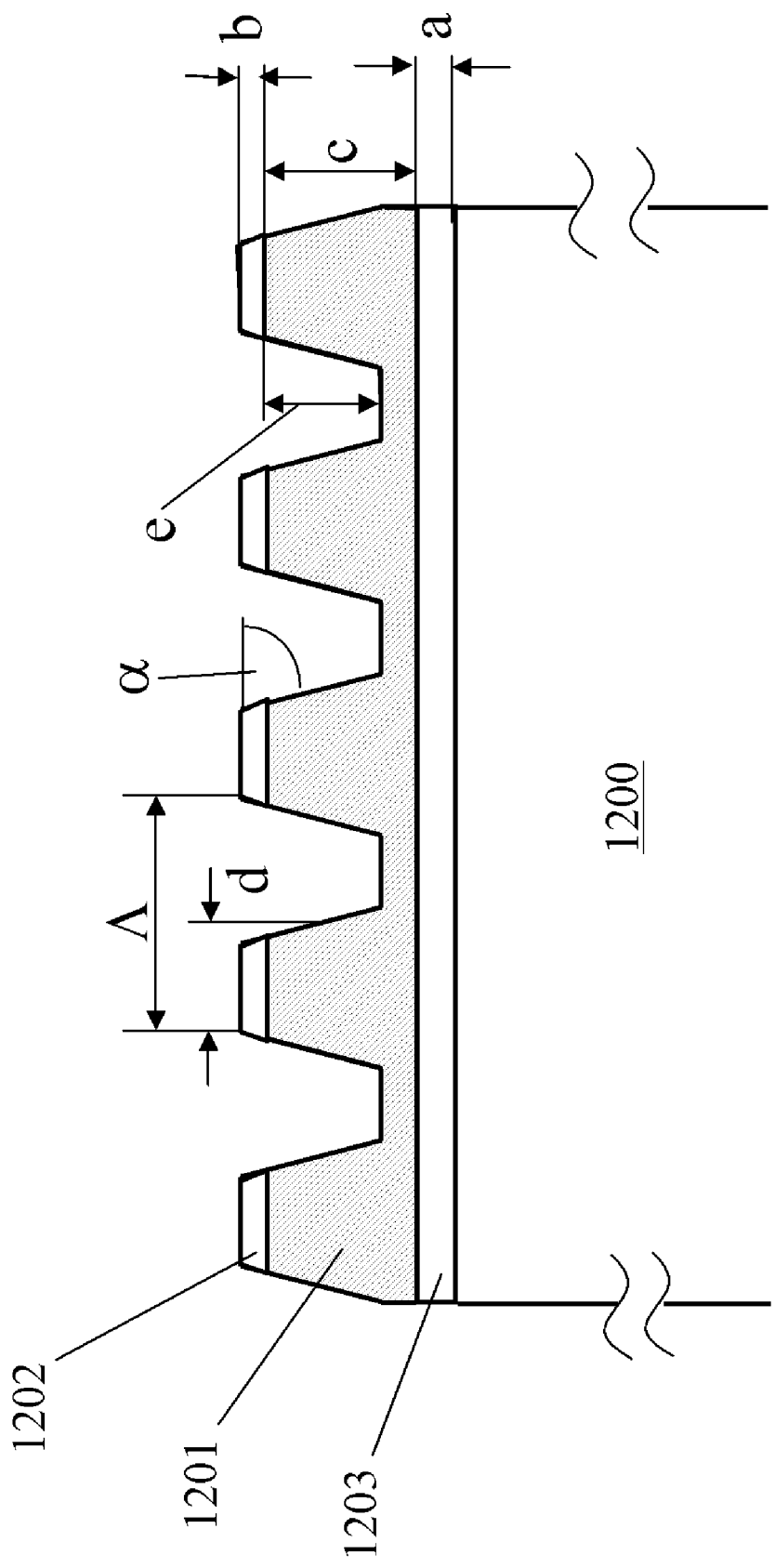
FIG. 12 is a schematic cross-sectional view of an exemplary optical transmission grating with impedance matching layers.

Another exemplary embodiment, optimized for an incidence angle of 50°, is shown in FIG. 12. The substrate 1200 comprises fused silica or similar material (n=1.446). A 1.1 μm (dimension c) thick layer 1201 with refractive index n=2.2 is etched 1 μm deep (dimension e). The trenches of the grating layer 1201 remain unfilled. The tops of the grating ridges or "teeth" are covered with impedance matching layer 1202 of thickness b=300 nm and refractive index 1.444. Unlike impedance matching layers of previous exemplary embodiments, which are substantially continuous, impedance matching layer 1202 comprises multiple, discrete, elongated regions that are positioned on a corresponding first grating region of grating layer 1201 (i.e., the grating ridges). Layer 1202 functions both as antireflection-coating and impedance matching layer for the grating layer 1201. The grating period is 1.035 μm and the duty cycle is 56%, i.e., dimension d is 580 nm. The grating layer 1201 rests on an impedance matching layer 1203 of thickness a=230 nm of material with refractive index n=1.7. For example, layer 1203 can comprise sapphire or glassy/amorphous $Al_2O_3$ and can be formed using any suitable techniques. Other optical materials of similar refractive index and properties can also be employed to yield operationally acceptable performance. The bottom of substrate 1200 can also be antireflection coated (not shown). As with previous embodiments, other specific material with corresponding refractive indices and thicknesses can be employed to provide essentially equivalent performance. Simulations described above can be employed for determining tolerances the various grating design parameters. The grating of FIG. 12 is optimized for operation as a demultiplexer in the ITU telecom C-band, 1525-1565 nm, and exhibits performance characteristics similar to those shown in FIGS. 7, 8A, and 8B. The design incidence angle is 50°, but similar performance is exhibited for angles of incidence of 50°±5°.

The exemplary optical grating of FIG. 12 can be formed depositing layers 1201 and 1202 on top of layer 1203 on the substrate 1200, then etching through layer 1202, and then etching layer 1201 to e=1 μm. Alternatively, layer 1201 can be deposited and then etched, and then layer 1202 can be deposited using a non-conformal deposition (i.e., top-down directional deposition). Such a process forms coating 1202 in the bottoms of the trenches between the grating ridges (not shown). This can be advantageous by providing additional impedance matching to the high index layer 1201 at the trench bottom. The grating structure of FIG. 12 provides operationally acceptable performance for non-vertical side walls throughout the approximate range of α=78-90°.

Variations of the embodiment of FIG. 12 are shown in FIGS. 13A and 13B. All dimensions, materials, refractive indices and other optical properties in FIGS. 13A and 13B are the same as those of FIG. 12 except for the thickness dimension c and etch depth e. For both FIGS. 13A and 13B, c=1 μm. In the embodiment of FIG. 13B, the etch depth e>1.23 μm, i.e., layers 1301, 1302 and 1303 are all etched through. Alternatively, layers 1301 and 1303 are etched through and layer 1302 is deposited afterward in a top-down (i.e., non-conformal) manner. The indices of substrate 1300 and layer 1302 are preferably substantially equal to one another in that arrangement. In the embodiment of FIG. 13A, the etch depth e=1.0 μm, i.e., only layers 1301 and 1302 are etched. The embodiments of FIGS. 13A and 13B provide operationally acceptable performance for non-vertical sidewall angles throughout the approximate range of α=78-900.

Figure 14:
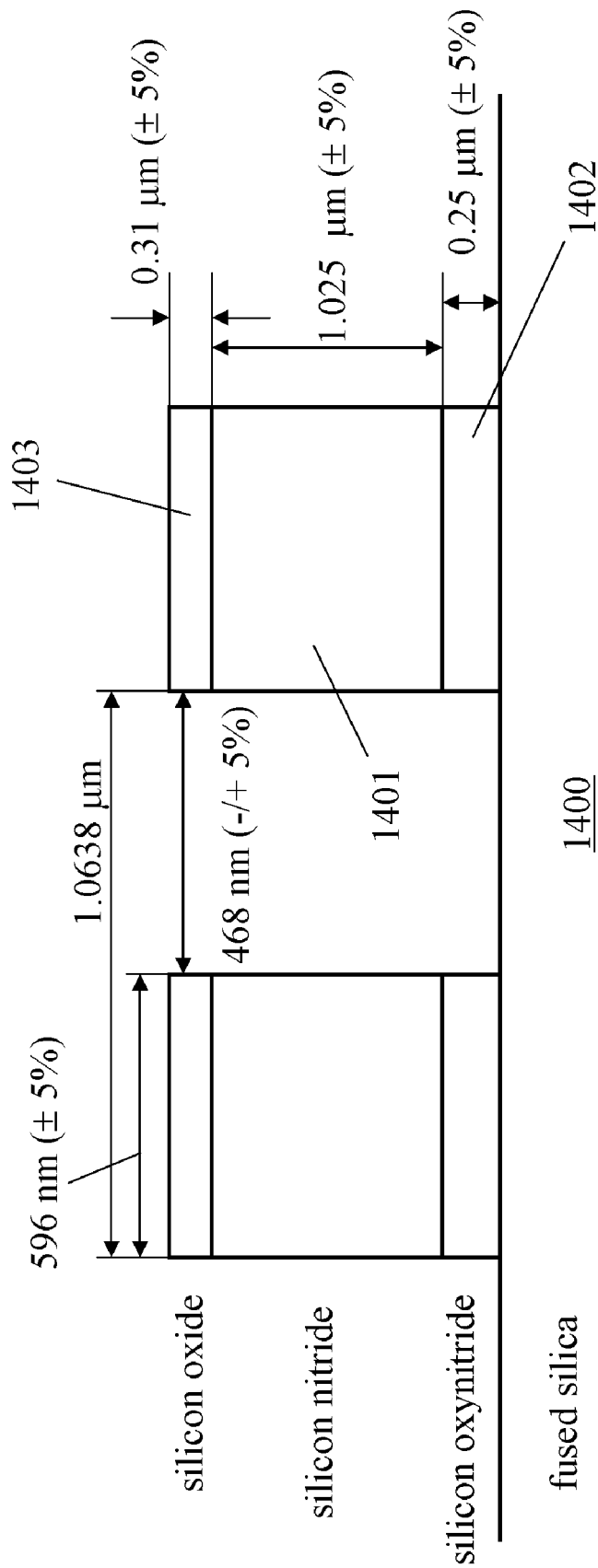
FIG. 14 is a schematic cross-sectional view of an exemplary optical transmission grating with impedance matching layers.

Another exemplary embodiment, designed for an incidence angle of 46.56°, is shown in FIG. 14. The optical transmission grating is formed on a fused silica substrate 1400 (n=1.446), and comprises a 1.025-μm thick layer 1401 of SiN (n=2.2) that is sandwiched between a lower impedance matching layer 1402 comprising silicon oxynitride ($Si_xON_y$, n=1.7) and an upper impedance matching layer 1403 comprising silicon dioxide (n=1.45). All materials can be deposited by plasma-enhanced chemical vapor deposition or physical vapor deposition or other conventional thin-film deposition processes. The grating period is 1.0638 μm and the duty cycle 56%, i.e., the grating line width is 596 nm and the trench width is 468 nm. The grating is optimized for operation as a demultiplexer in the ITU telecom C-band, 1526-1566 nm. FIG. 14 explicitly lists tolerances for materials refractive indices, layer thicknesses, sidewall angle, duty cycle, and etch depth that yield operationally acceptable device performance. Useful gratings can be formed with parameters outside the tolerance range indicated. The grating will also function acceptably if the trench is etched too deep, i.e., the etch extends into the fused silica substrate, or too shallow, i.e., a residual layer of silicon oxynitride is left on the substrate. The tolerances given in FIG. 14 are exemplary and should not be viewed at constraining the scope of the present disclosure or appended claims. Depending on the specific application, acceptable performance may be reached without meeting these specific tolerances.

Figure 15:
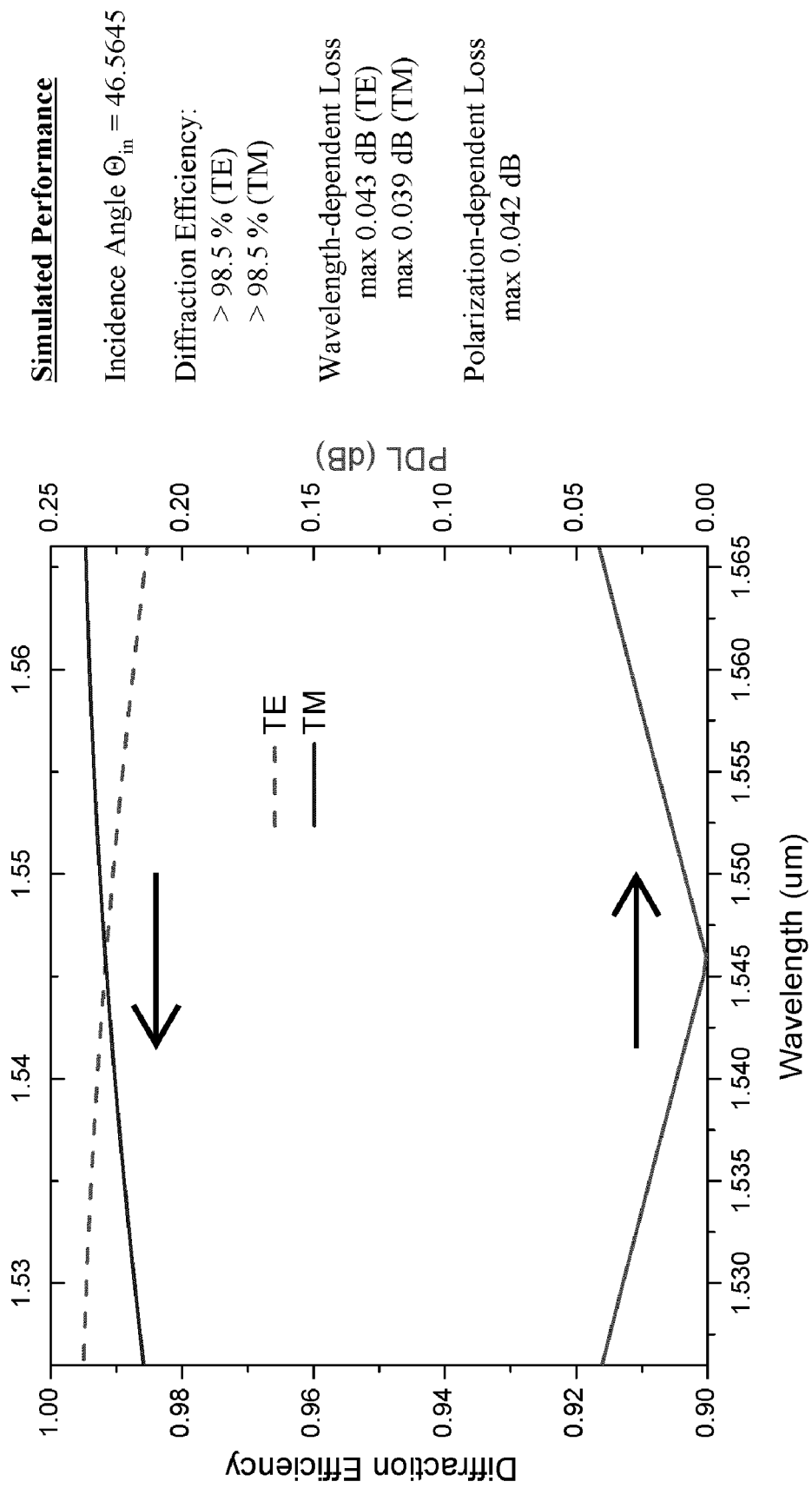
FIG. 15 is a calculated plot of diffraction efficiency and polarization dependent loss (PDL) versus wavelength for one arrangement of the exemplary optical grating of FIG. 14.
Figure 16:
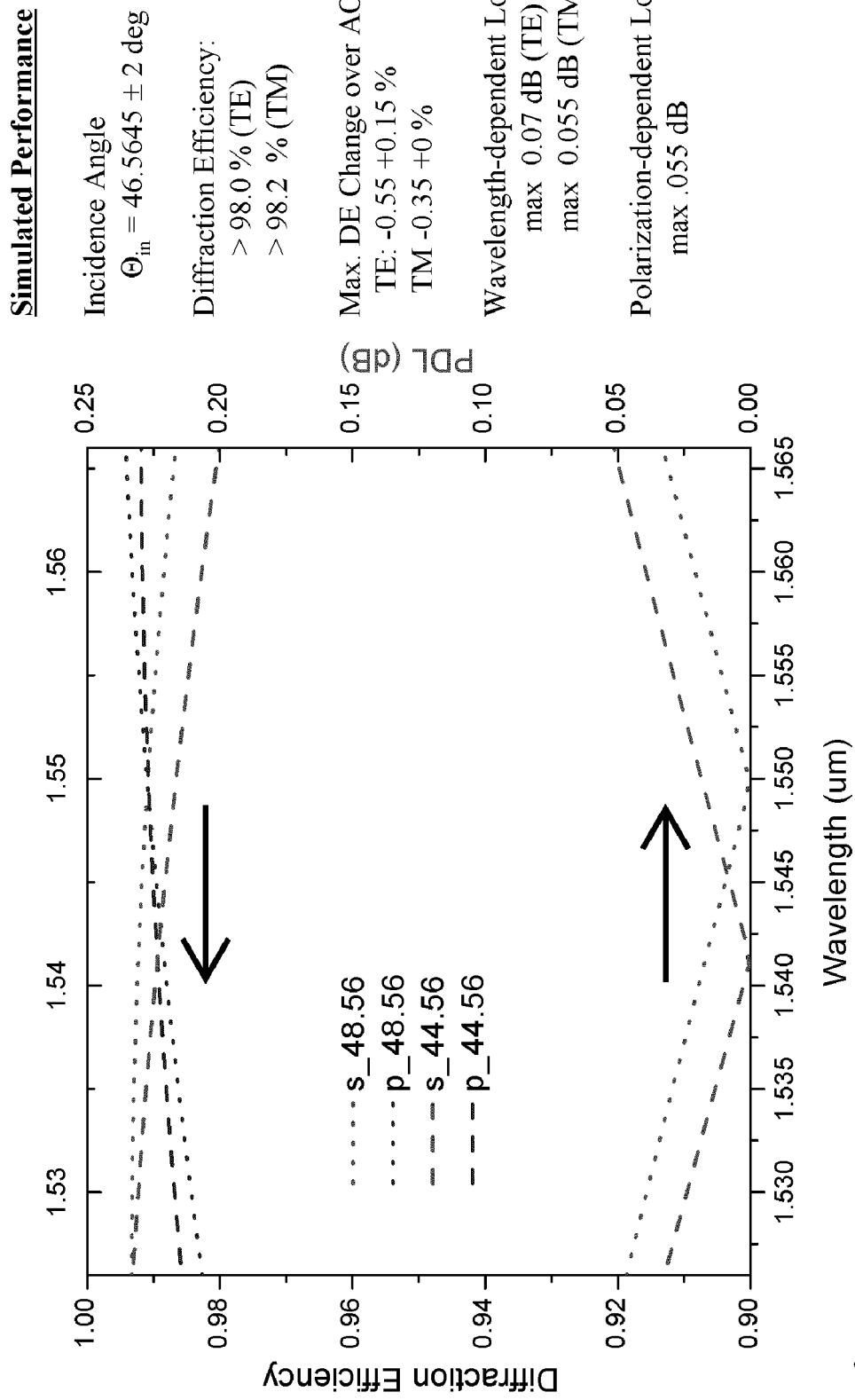
FIG. 16 is a calculated plot of diffraction efficiency and polarization dependent loss (PDL) versus wavelength for alternative arrangements of the exemplary optical grating of FIG. 14.

FIG. 15 shows simulated grating performance over the wavelength range for the optical grating of FIG. 14. FIG. 16 shows the simulated performance in graphical and tabular form when the input angle is varied ±2° about the design angle. FIG. 17 contains a table specifying grating performance, specifically minimum diffraction efficiency (DE) and maximum polarization-dependent loss (PDL) over a wavelength range of 1526-1566 nm, when grating dimensions, refractive indices and other parameters are varied. The first column specifies the parameter being varied, and the second column the amount of variation. The third and fourth columns show the resulting performance parameters (DE and PDL) and the fifth and sixth columns show the change of those parameters from those obtained under the optimized conditions as shown in FIG. 15.

Figure 18:
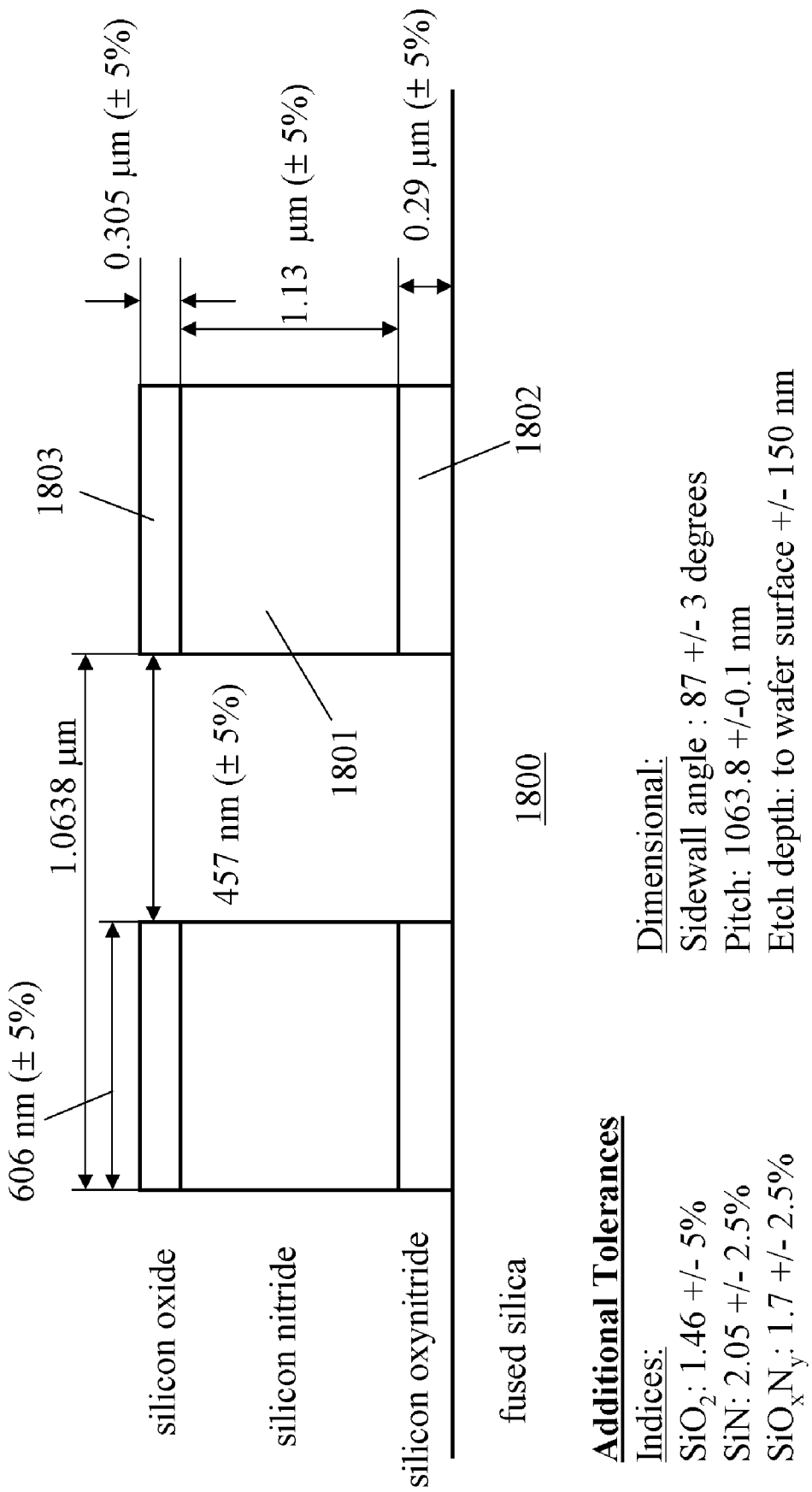
FIG. 18 is a schematic cross-sectional view of an exemplary optical transmission grating with impedance matching layers.

Another exemplary embodiment, designed for an incidence angle of 46.56°, is shown in FIG. 18. The optical transmission grating is formed on a fused silica substrate 1800 and comprises a 1.13-μm thick layer 1801 of SiN (n=2.05) that is sandwiched between a lower impedance matching layer 1802 comprising silicon oxynitride ($Si_xON_y$, n=1.7), and an upper impedance matching layer 1803 comprising silicon dioxide (n=1.46). All materials can be deposited by plasma-enhanced chemical vapor deposition or other conventional thin-film deposition. The grating period is 1.0638 μm and the duty cycle 57%, i.e., the grating line width is 606 nm and the trench width is 457 nm. The grating is optimized for operation as a demultiplexer in the ITU telecom C-band, 1526-1566 nm. FIG. 18 explicitly lists tolerances for material refractive indices, layer thicknesses, sidewall angle, duty cycle, and etch depth that yield operationally acceptable grating performance. The grating will also function acceptably if the trench is etched too deep, i.e., if the trench extends into the fused silica substrate, or too shallow, i.e., a residual layer of silicon oxynitride is left on the substrate. The tolerances given in FIG. 18 are exemplary and should not be viewed at a constraining the scope of the present disclosure or appended claims. Depending on the specific application, acceptable performance may be reached without meeting these specific tolerances.

Figure 19:
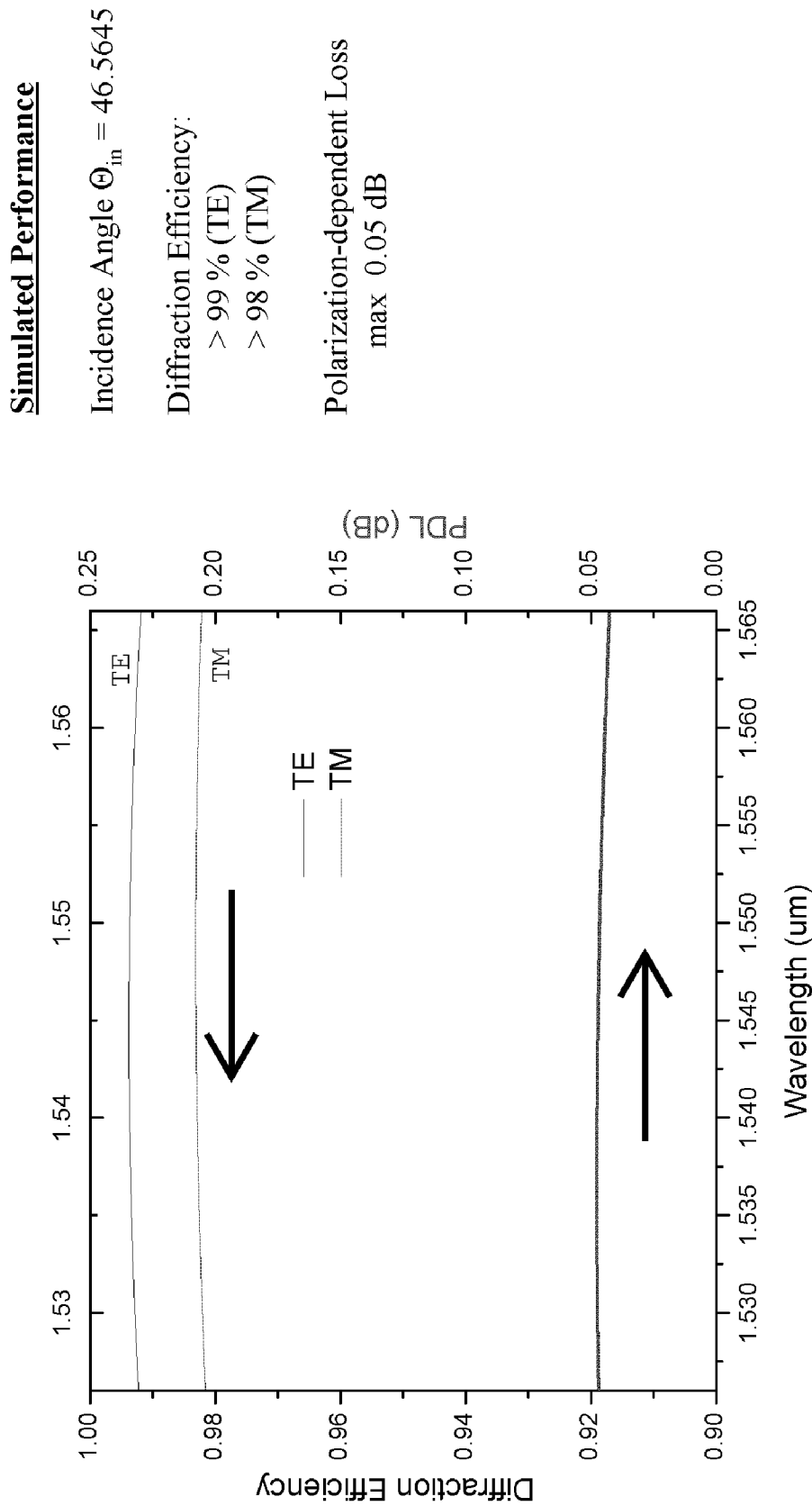
FIG. 19 is a calculated plot of diffraction efficiency and polarization dependent loss (PDL) versus wavelength for the exemplary optical grating of FIG. 19.

FIG. 19 shows the simulated grating performance over the wavelength range for the grating of FIG. 18. FIG. 20 contains a table specifying grating performance, specifically minimum diffraction efficiency and maximum polarization-dependent loss, when grating dimensions, refractive indices, and other parameters are varied from the optimized design of FIG. 18, in a form similar to that of FIG. 17. The changes in DE and PDL in the table of FIG. 20 are with relative to the performance shown in FIG. 19.

Figure 21:
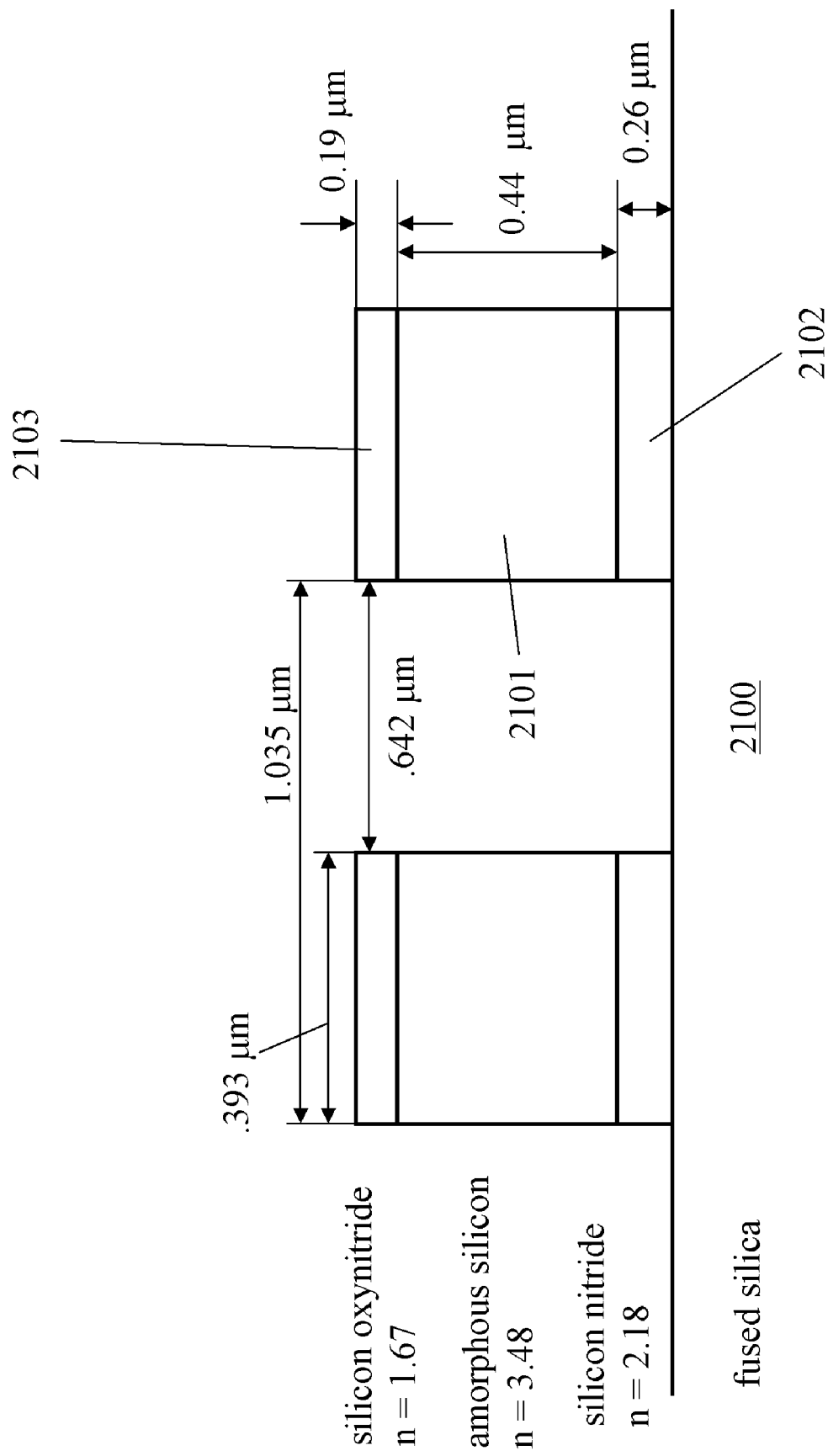
FIG. 21 is a schematic cross-sectional view of an exemplary optical transmission grating with impedance matching layers.

Another exemplary embodiment, designed for an incidence angle of 50°, is shown in FIG. 21. The optical transmission grating is formed on a fused silica substrate 2100 and comprises a 0.44-µm thick layer 2101 of amorphous silicon (n=3.48) that is sandwiched between a lower impedance matching layer 2102 comprising silicon nitride (SiN, n=2.18) and an upper impedance matching layer 2103 comprising silicon oxynitride ($Si_xON_y$, n=1.67). All materials can be deposited by plasma-enhanced chemical vapor deposition or other conventional thin-film deposition. The grating period is 1.035 µm, the grating line width is 393 nm, and the grating trench width is 642 nm. The grating is optimized for operation as a demultiplexer in the ITU telecom C-band, 1526-1566 nm. Other similar materials maybe substituted for those shown in FIG. 21. For example, the top impedance matching layer 2103 could comprise aluminum oxide and the bottom impedance matching layer could comprise titanium dioxide or tantalum pentoxide.

Referring back to FIG. 1C, grating layer 100 is arranged as a reflection grating. Many of the features and parameters applicable to the transmission gratings described above are also applicable to reflection gratings described below. The adjacent medium above the reflection grating is air or another inert gas. The grating layer 100 is positioned on a reflective layer or set of layers 103 that is highly reflective over the operational wavelength and angular range of interest. The reflective layer 103 can be a metal layer or thin-film multi-layer dielectric stack arranged to provide high reflectivity. The grating layer 100 and reflective layer 103 rest on a substrate 104 that comprises any suitable material, including but not limited to silicon, fused silica, quartz, borosilicate glass, borophosphate glass, or soda lime glass.

In FIG. 1C, an incident optical signal with wave vector $k_{in}$ is incident on the grating layer 100. In this example the signal's incident angle $\theta_{in}$ (with respect to the grating normal) is chosen so that the magnitude of the incident signal's wave vector component along the x-axis is about equal to half of the grating wave vector magnitude. That geometry results in a reflected diffracted wave with wavevector $k_{r-1}$ that is approximately collinear but anti-parallel with the input signal (reflected negative first order diffracted signal). Wavevector $k_{r0}$ denotes the specularly reflected signal (zeroth order diffracted signals).

The diffraction efficiency of the reflected negative first order diffracted signal depends on the thickness d of the grating as well as the bulk refractive indices $n_{hi}$ and $n_{lo}$ of the first and second grating regions 101 and 102, respectively, in a manner similar to the transmission gratings described above. For appropriately chosen grating thickness and refractive indices, greater than 90% of the incident optical signal can be diffracted into the first reflected diffracted order. Additionally, the duty cycle of the grating can be optimized along with the bulk indices and thickness to reduce the polarization-dependence of the diffraction efficiency into the first diffracted order, as described further below.

As described above, the incident optical signal couples into the "fast" and "slow" bound modes that propagate perpendicular to the grating layer 100 (as in FIGS. 2A and 2B). The diffraction efficiency of the negative first reflected diffracted order is affected by the phase difference between fast and slow modes that is accrued after propagation twice through the grating layer thickness d, with reflection by layer 103. If that phase difference is about equal to $\pi$ (or another odd multiple of $\pi$) at a specified wavelength of interest, maximum diffraction efficiency into the first reflected order is achieved for that grating layer configuration. The magnitude of the phase difference is related to the product of grating thickness d and refractive index difference. A larger index contrast between $n_{lo}$ and $n_{hi}$ enables a smaller grating layer thickness d to be employed to achieve a given accrued phase difference, just as with the transmission gratings described previously.

The reflection grating of FIG. 1C will exhibit oscillatory behavior of its diffraction efficiency with respect to grating layer thickness entirely analogous to the behavior illustrated in FIGS. 4A-4F for transmission gratings. That oscillatory behavior can mitigated by an impedance matching layer between the grating layer and an adjacent medium. In the case of a reflection grating, however, only one impedance matching layer is required; the reflective layer occupies the second surface of the grating layer.

Figure 22:
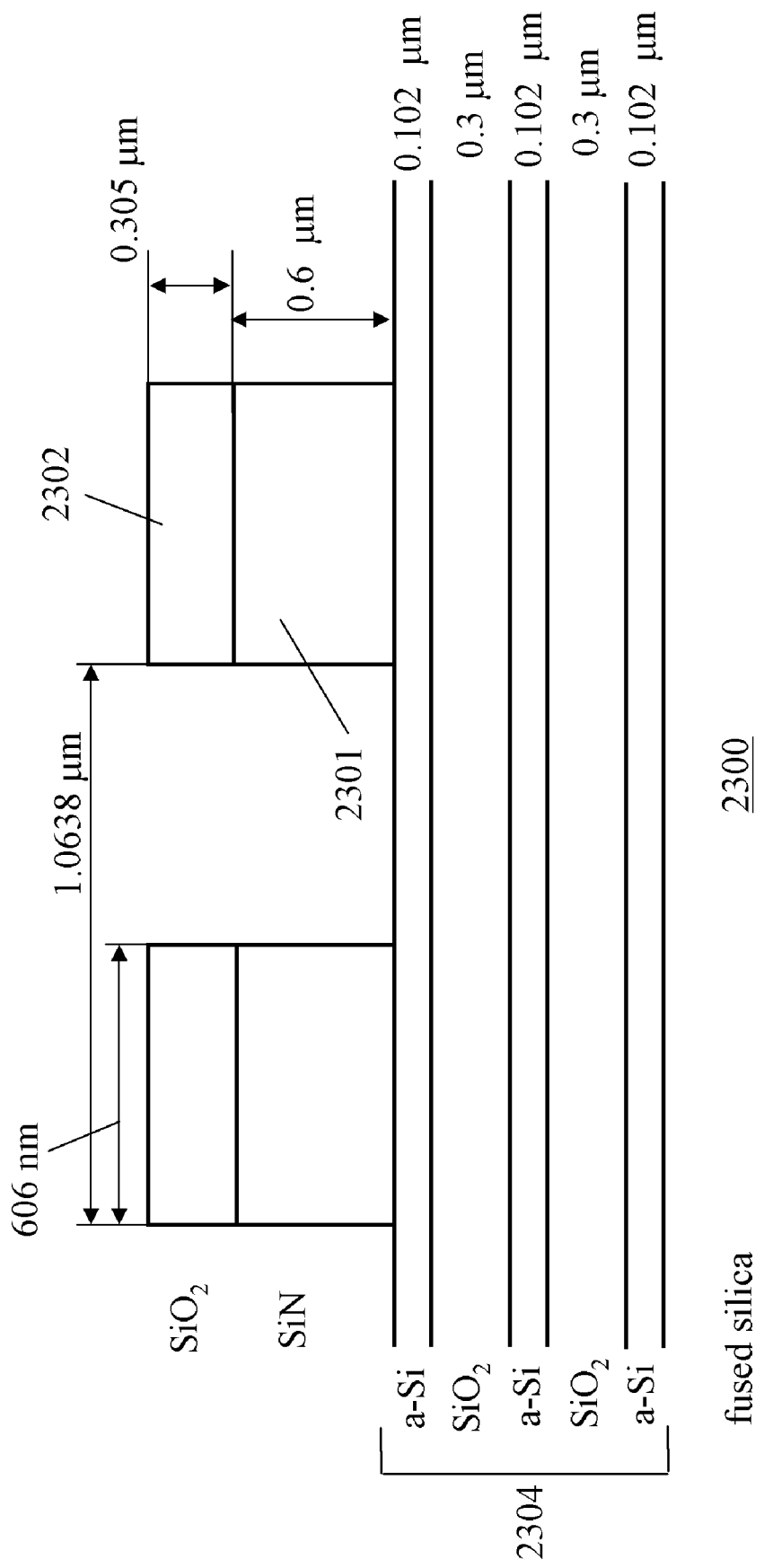
FIG. 22 is a schematic cross-sectional view of an exemplary optical reflection grating with an impedance matching layer.

FIG. 22 shows an exemplary embodiment of a reflection grating with an impedance matching layer. The reflection grating layer 2301 is formed on a fused silica substrate 2300 (n=1.446) and comprises a 600-nm thick layer of silicon nitride (n=2.05) that is etched and left unfilled ($n_{lo}$=1). The grating period is 1.0638 µm and the duty cycle 65%, i.e., the SiN ridge width is 691 nm and the width of the trench is 373 nm. A $SiO_2$ layer 2302 on top of the silicon nitride grating functions as the impedance matching layer. The grating structure rests on a 5-layer thin-film stack 2304 consisting of alternating layers of amorphous silicon (n=3.71, 102 nm thick) and $SiO_2$ (n=1.46, 300 nm thick) that functions as the reflective layer. The grating is optimized for operation in the ITU telecom C-band, 1525-1565 nm, at an angle of incidence of 45°. The optical grating of FIG. 22 can be fabricated using any suitable conventional methods, including those used in the semiconductor industry. Examples include but are not limited to electron-beam vacuum deposition, photolithography, reactive-ion etching, and thermal annealing. Any of the specific materials can be replaced by others of similar optical properties such as transparency, refractive index, and so forth.

The impedance matching layer 2302 can be designed as described above for transmission grating impedance matching layers, i.e., the thickness and suitable refractive index can be calculated using the Fresnel equations. The thickness of the layer 2302 is designed so that an optical phase difference of about $\pi+2N\pi$ (an odd multiple of $\pi$ for an integer N), arises between the reflection from the first surface (top, air-SiO2 interface in FIG. 22) and the second surface (bottom, $SiO_2$—SiN interface) of the layer 2302. Smaller values of N provide for impedance matching that is effective over a wider spectral range. Larger values of N provide more effectively averaging over the spatially varying index of the grating layer 2301 (to a first approximation, an average of $n_{lo}$ and $n_{hi}$, weighted by the duty cycle). The refractive index of the impedance matching layer is chosen, for the selected wavelength and angle of incidence, so that the magnitudes of the Fresnel reflection coefficients for reflection from the two surfaces of the impedance matching layer are equal or as closely equal as practicable given the available, compatible materials. Analytical or numerical calculations can be performed to approximate or refine the optimum parameters of the impedance matching layer.

In some instances, the phase change upon reflection from the reflecting layer may differ for the fast and slow modes. In such a case, to achieve high diffraction efficiency, an accrued optical phase difference between slow and fast modes equal to about an odd multiple of π is needed that includes portions accrued during propagation through the grating layer as well as the phase difference that arises upon reflection.

As described above, the difference between modal indices $n_{hi}$ and $n_{io}$ is often different for the two principal input polarizations TE and TM. Substantially polarization independent behavior of the high diffraction efficiency can be obtained when the modal phase difference is about equal to an odd multiple of π for both polarizations. That can be achieved, at least approximately, by suitably tailoring the grating morphology, (i.e., grating duty cycle, grating layer thickness, and bulk refractive indices of the two grating regions). In some instances, the phase shift upon reflection from the reflecting layer might differ between the slow and fast modes and might also be polarization dependent. If substantially polarization-independent grating behavior is desired, the grating layer thickness, duty cycle, and indices must be selected so that the aggregate accrued phase difference (arising from both propagation through the grating layer and reflection) is about equal to an odd multiple of π for both polarizations. Achieving that phase difference for both polarizations simultaneously may not be possible for every combination of material indices, but a grating layer arrangement can typically be found that yields operationally acceptable performance over a selected range of wavelengths. In some instances wherein the aggregate phase difference between the two grating modes depends upon these two independent structures (grating layer and reflector), a wider wavelength range over which operationally acceptable performance (e.g., high efficiency or polarization independence) can sometimes be achieved by using one phase shift to at least partly compensate for the other to achieve a phase difference about equal to an odd multiple of π over a larger spectral range than would be possible with the grating layer alone.

As is well know in the art of thin film optical coatings, reflective dielectric stacks can be designed to have highly tailored reflective amplitude and phase properties. Those can be exploited to incorporate additional functionality into the optical gratings disclosed herein. For example, the reflective layer can comprise a dielectric thin film stack with one or multiple cavities that provide a non-linear overall reflective phase transfer function (as a function of incident wavelength). Such a phase transfer function can be employed, e.g., to steer the diffracted beam to output angles other than those dictated by the grating equation and grating spacing. In another example, the reflective amplitude transfer function of the thin film reflector can be employed to tailor the overall spectral response of the grating to desired behavior.

Figure 23:
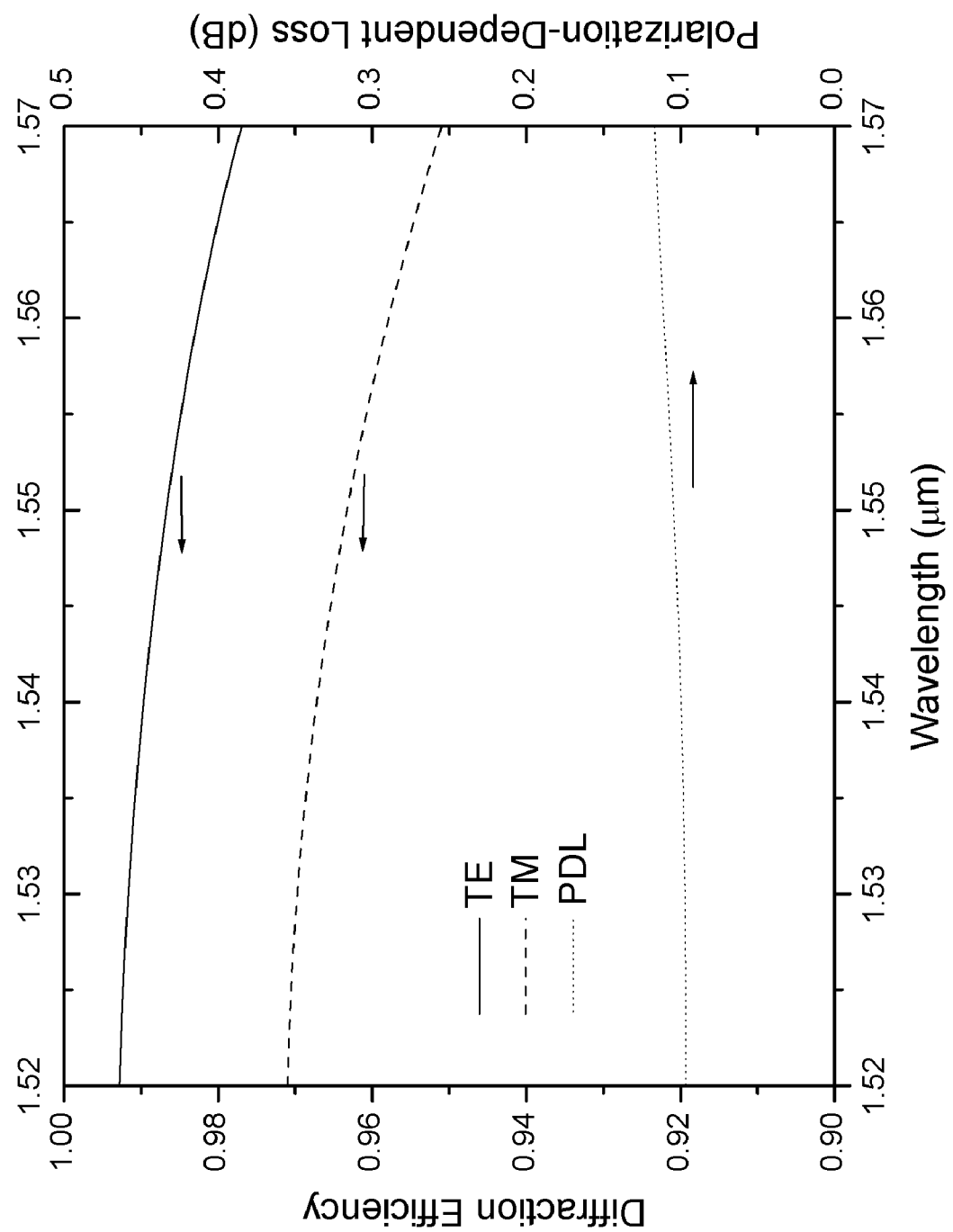
FIG. 23 is a calculated plot of diffraction efficiency and polarization dependent loss (PDL) versus wavelength for the exemplary optical grating of FIG. 22.

In some instances it may be advantageous to minimize the Fresnel reflection coefficient difference for both input signal polarizations, while in other instances it may not be possible or necessary. For example, the optical grating can be designed so that the angle of incidence is close to Brewster's angle for the average refractive index of the grating layer 2301, which minimizes the reflection coefficient for p-polarized input light (or TM polarization). Optimization of the impedance matching layer 2302 can be performed considering only s-polarized input light (i.e., TE polarization) to minimize reflection from the grating layer 2301. Simulated optical performance of the optical reflection grating of FIG. 22 is shown in FIG. 23.

Figure 24:
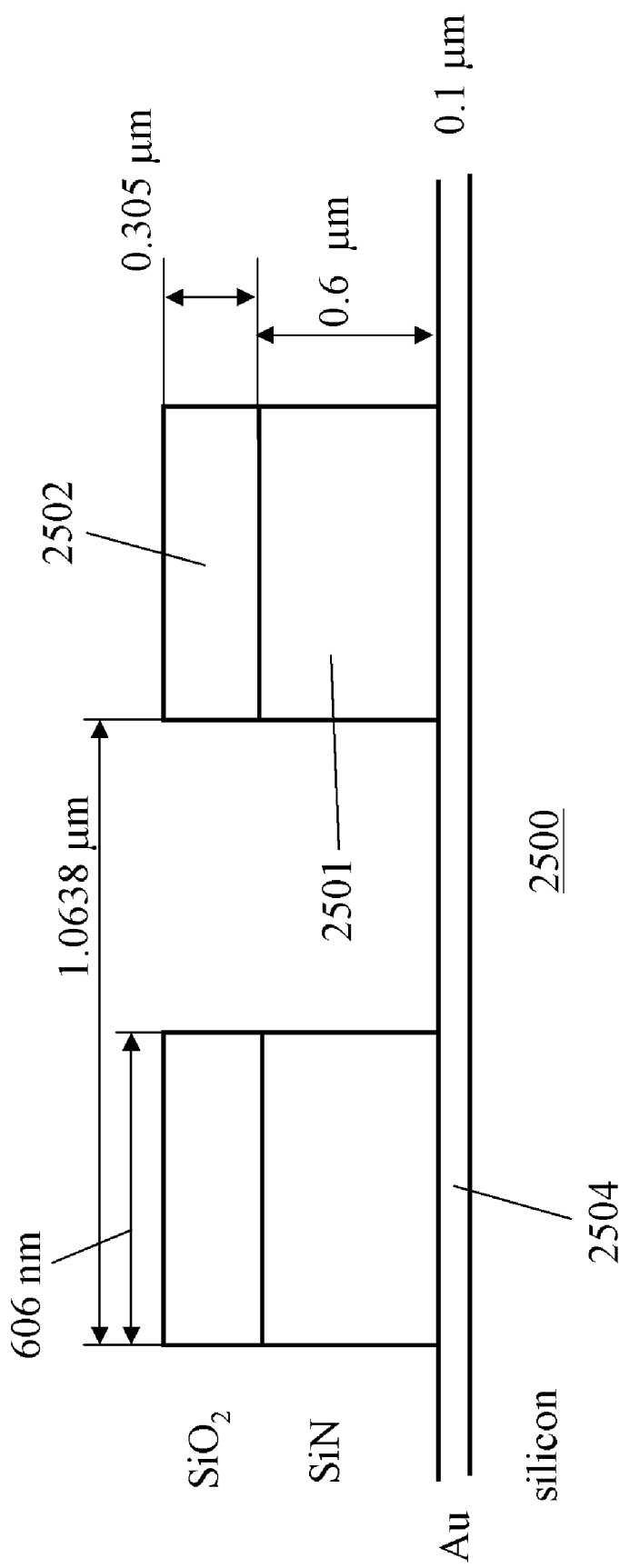
FIG. 24 is a schematic cross-sectional view of an exemplary optical reflection grating with an impedance matching layer.
Figure 25B:
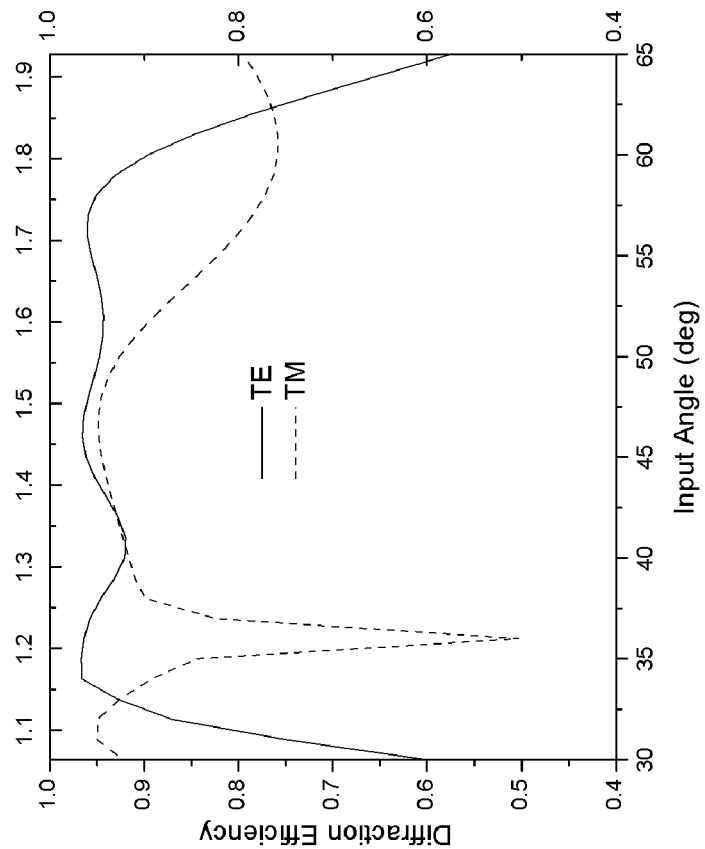
FIG. 25B is a calculated plot of diffraction efficiency versus incident angle for the exemplary optical grating of FIG. 24.
Figure 25A:
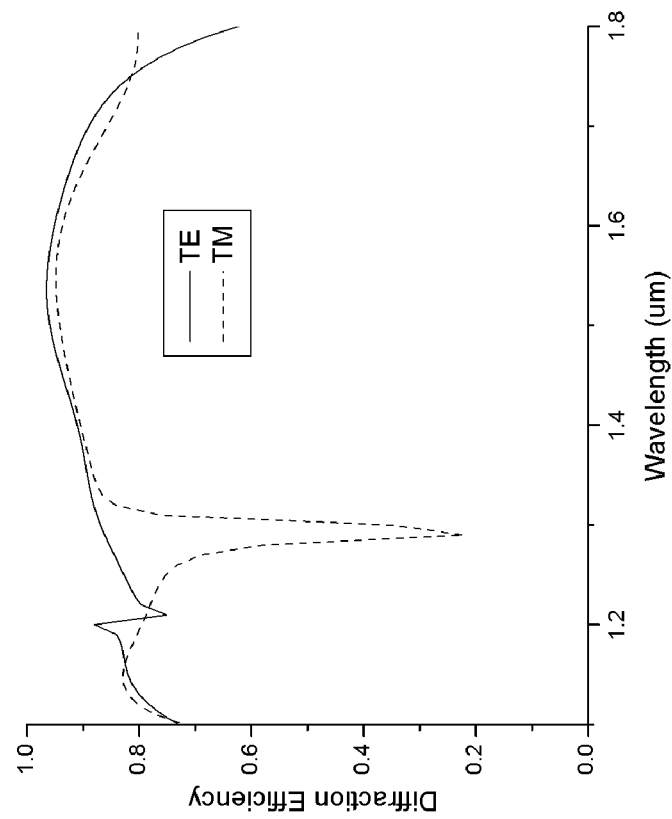
FIG. 25A is a calculated plot of diffraction efficiency versus wavelength for the exemplary optical grating of FIG. 24.

Another exemplary embodiment of an optical reflection grating is shown in FIG. 24. The grating layer 2501 is formed on top of a 100 nm-thick gold layer 2504 rather than the multi-layer stack of FIG. 22. The grating layer 2502 and gold layer 2504 rest on a silicon substrate 2500. All other parameters of the grating layer 2501 and the impedance matching layer 2502 are the same as for the grating of FIG. 22. To enable adequate adhesion of the gold layer 2504 (and hence the grating layer 2501) to the silicon substrate 2500, use of an adhesion promotion layer such as chromium might be desirable. Other metals, e.g., aluminum or silver, can be employed as the reflective layer 2504; certain other metals, e.g., aluminum, have better adhesion properties than gold to both the silicon substrate and the silicon nitride grating layer. The optical performance of the optical reflection grating of FIG. 24 is shown in FIGS. 25A and 25B. FIG. 25A shows the diffraction efficiency as a function of input wavelength for a fixed input angle of 45°. FIG. 25B shows the diffraction efficiency as a function of input angle, with the input wavelength varied to satisfy the Littrow condition ($\lambda=2\times\Lambda\times\sin\theta_{in}$) as the input angle is varied.

Figure 26A:
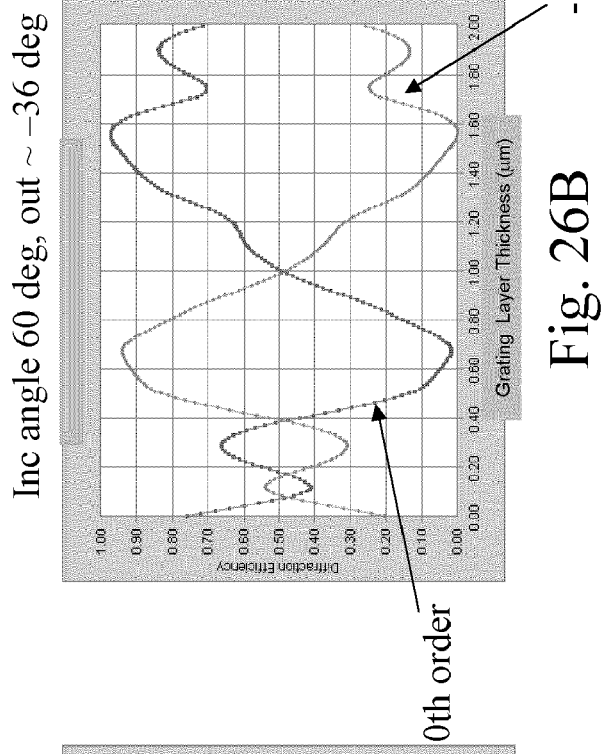
FIGS. 26A-C are calculated plots of diffraction efficiency versus grating layer thickness for differing incident and diffracted angles for an exemplary optical grating.
Figure 26B:
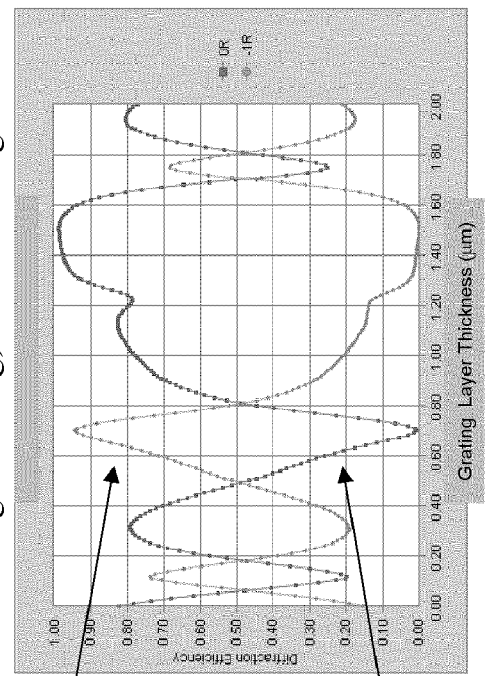
Figure 26C:
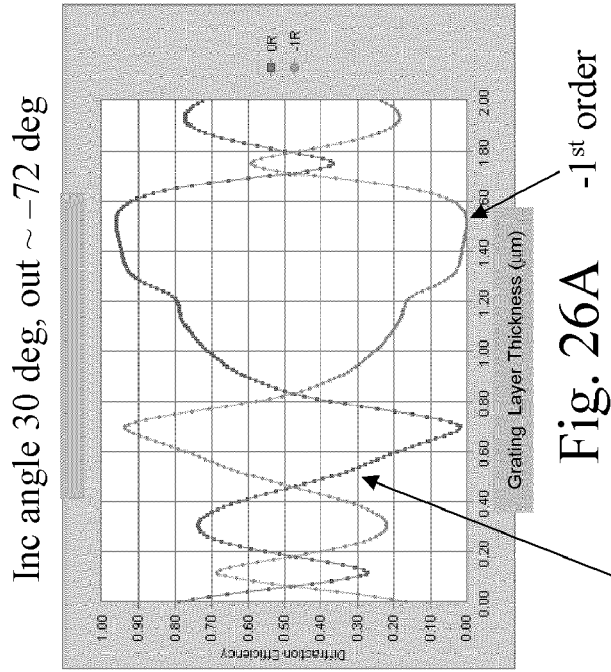

Reflection gratings made according to the teachings of the present disclosure also can be made highly efficient for diffracting arrangements other than that of Littrow incidence. FIGS. 26A-26C show the diffraction efficiency as a function of grating layer thickness for the reflection grating of FIG. 24 for differing diffraction geometries. The wavelength of the TE-polarized incident signal is 1.545 μm. Incident and diffracted angle for the negative first diffracted order vary among the three graphs. For each incident angle, a grating layer thickness can be identified for which the first order diffraction efficiency is more than 90%. The grating has no diffracted orders for input angles<26.70, and the diffracted beam is always located on the same side of the grating normal as the input beam (since $\lambda/\Lambda>1$). Similarly, for transmission gratings, strict adherence to a Littrow diffractive geometry is not necessary, and high diffraction efficiency (>90%) and low polarization-dependent loss may be achieved using the teachings of the present disclosure for other incidence angles and wavelength-to-grating-period ratios.

The graphs of FIGS. 27A-27C further demonstrate that the optical gratings disclosed herein can be made highly efficient in non-Littrow diffractive geometries. In FIGS. 27A and 27B, diffraction efficiency for the device of FIG. 24 is plotted as a function of the thickness of grating layer 2501 for TE and TM polarized incident light, respectively. The wavelength of the incident signal is 1.545 μm. The incident angle is 65° (rather than 45° as in FIG. 25A) and the output angle for the negative first diffraction order is near −30°. The diffraction efficiency for both polarizations peaks near a grating layer thickness of about 600 nm. FIG. 27C shows the diffraction efficiency plotted against input wavelength for the same input angle and unpolarized light. All other conditions and parameters are the same as those described for the grating of FIG. 24. The grating is better than 80% efficient over a large wavelength range (ca. 1.45-1.85 μm) for this non-Littrow incidence condition. The diffraction efficiency can be improved by re-optimizing the impedance matching layer 2502 (i.e., its refractive index, material, or thickness) from the parameters of FIG. 24 to those suitable for the new incidence angle.

Figure 28:
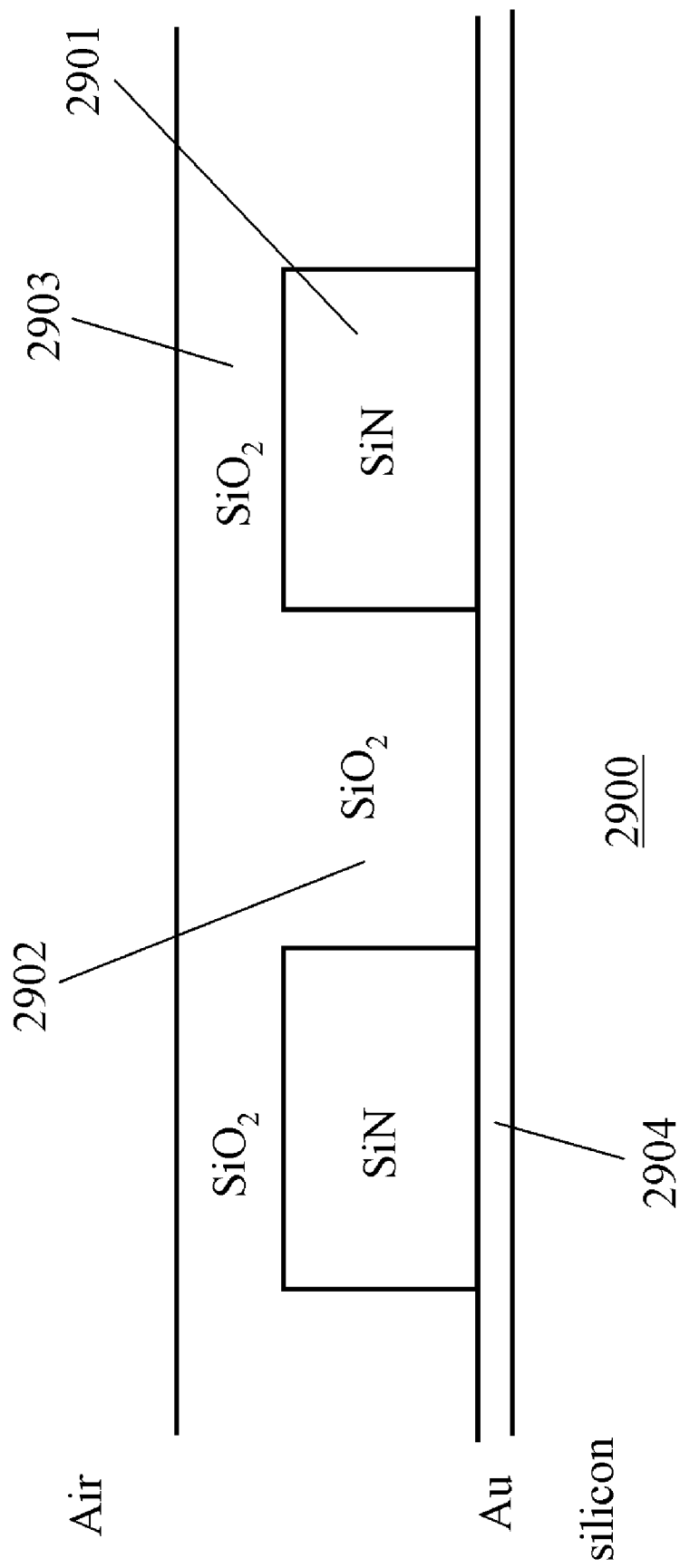
FIG. 28 is a schematic cross-sectional view of an exemplary optical reflection grating with an impedance matching layer.

Another exemplary embodiment is shown in FIG. 28. The reflection grating of FIG. 28 is similar to that of FIG. 24 in most dimensions, materials, and refractive indices, except that the grating trenches, which consist of air in FIG. 24 ($n_{io}=1$), have been filled in with the same dielectric material (i.e., silicon dioxide) that provides impedance matching layer 2903 for the silicon nitride grating layer 2901. Because the index contrast between materials in the high index grating material 2901 (silicon nitride) and the low index grating material 2902 (silicon dioxide) is about half the contrast of the grating of FIG. 24, the grating layer thickness is increased by a proportional factor to enable optimized or operationally acceptable diffraction efficiency. Other materials including polymers or other materials that readily conform to irregular surface structure while still providing a flat outer surface, can be employed to fill the grating trenches.

Figure 29:
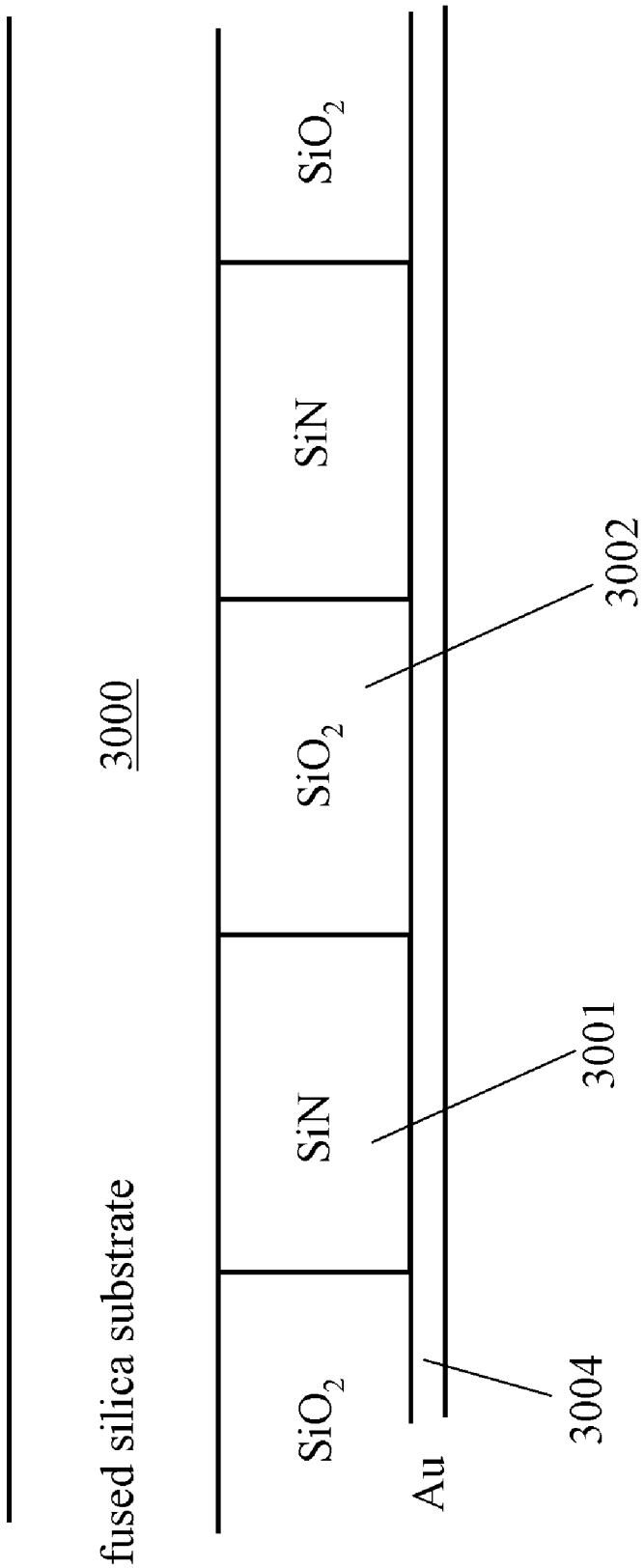
FIG. 29 is a schematic cross-sectional view of an exemplary optical reflection grating with an impedance matching layer.
Figure 30:
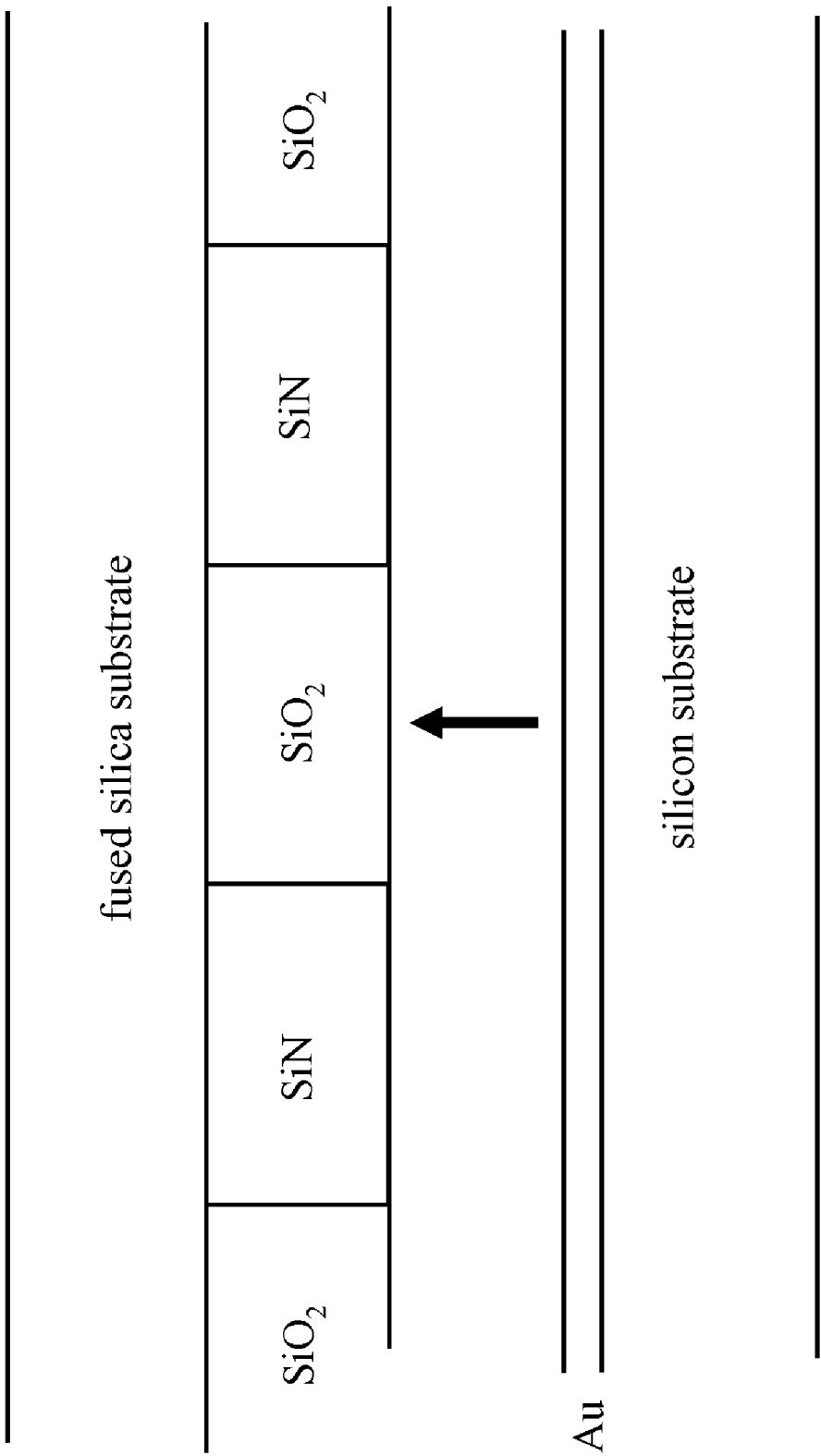
FIG. 30 illustrates schematically assembly of an exemplary optical grating layer and a reflecting layer.

Rather than forming the grating layer on top of the reflective gold layer, as in FIGS. 24 and 28, it can be advantageous to form the reflective metal layer 3004 on top of the grating layer 3001/3002, as shown in exemplary embodiment of FIG. 29. In such an arrangement, the incident light must propagate to and from the grating layer through the substrate 3000 (fused silica in this example). The optical grating of FIG. 29 can be fabricated by forming the grating layer 3001/3002 on the fused silica substrate 3000 and then depositing the reflective gold layer on top of the grating layer. In an alternative procedure, shown in FIG. 30, a dielectric grating layer formed on a fused silica substrate is butted up against a second substrate that is coated with gold or another reflective layer. The reflective layer can be held in place by optical contacting, by mechanically clamping the two substrates together, by bonding them with an appropriate optical adhesive or cement, or by another suitable methods. In the examples of FIGS. 29 and 30, the grating layer comprises regions of SiN (higher index) and silicon dioxide (lower index). In another exemplary embodiment (not shown) that can be particularly convenient to fabricate, a lower-index polymer can fill trenches between higher index grating ridges so as to form a substantially planar surface on which to deposit or contact the reflective layer. That flat surface can comprise a layer of polymer over the grating layer, or can comprise the tops of the ridges of the grating layer and the intervening polymer-filled trenches. In the case that a separate reflective layer is contacted with the grating layer, the polymer can also act as an adhesive.

As described above, impedance matching layers are formed from a single layer of dielectric material having a refractive index and thickness selected to suppress reflections at the surface of the grating layer. That arrangement is depicted schematically in FIG. 31A, with grating layer 3201 and impedance matching layers 3202 and 3203 formed on substrate 3000. Alternatively, one or both of the impedance matching layers in a transmission or reflection grating can be replaced by an impedance matching layer 3202 comprising a set of two layers (as in FIG. 31B) or a set of multiple layers (as in FIG. 31C) that are arranged to suppress reflections from the surface of the grating layer 3201. Such bi- or multi-layer impedance matching structures can be designed according to conventional methods, such as those described in such references as "Thin Film Optical Filters" by Angus McLeod (3ed, Institute or Physics, London, 2001), which is hereby incorporated by reference as if fully set forth herein. The spectral response of a bi- or multi-layer impedance matching structure can be designed, by the methods discussed in the reference, to transmit only selected spectral portions of light incident on the optical grating while reflecting or otherwise blocking other spectral portions. The ability to thus tailor the spectral response of the impedance matching layer, in addition to that of the grating layer, provides an additional means to influence the overall spectral response of the optical grating. Alternatively, the impedance matching layer can comprise sub-wavelength-scale structures, e.g., a periodic or aperiodic array of structural features that are substantially smaller than the wavelength of the incident light (as in FIG. 31D). Dimensions and refractive indices of the structural features can be selected so that the incident optical signal interacts with the impedance matching layer as if it were a homogeneous medium having a refractive index and layer thickness optimized to reduce reflections at the surface of the grating layer 3201. Such an arrangement enables the impedance matching layer to be locally optimized in an optical grating having, for example, a grating period or duty cycle that varies with position, without resorting to layers of varying thickness, which are problematic to fabricate. One example of such a sub-wavelength scale structure is a so-called moth-eye structure comprising sub-wavelength-sized pyramids of dielectric material. In the example of FIG. 31D, the shaded and unshaded regions of the sub-wavelength-structured impedance matching layer 3202 comprise dielectric materials with differing refractive indices, with the relative volumes occupied by each material determining the effective index of the layer. Alternatively, one of the regions can be left unfilled, e.g., one of the constituent materials of the layer 3202 would be air.

As described above, high diffraction efficiency was obtained by introducing appropriate phase shifts between two propagating grating optical modes that propagate through the grating layer, and by limiting the number of available diffracted orders by choosing suitable grating period and incidence conditions. Operationally acceptable levels of diffraction efficiency can also be achieved in some cases wherein multiple, i.e., more than two, grating modes or multiple diffracted orders are present. The presence of more than two grating modes can in some instances enable additional design flexibility for highly efficient grating devices.

Figure 32A:
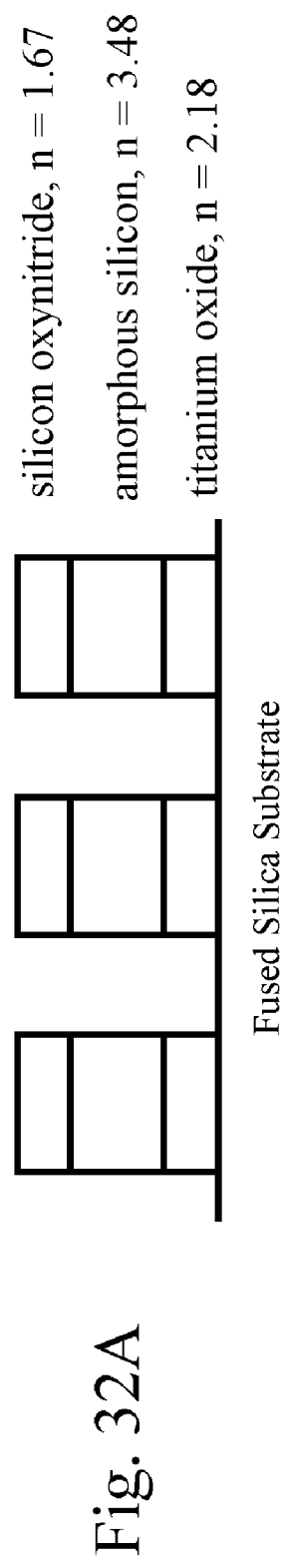
FIG. 32A is a schematic cross-sectional view of an exemplary optical grating with impedance matching layers.

An exemplary embodiment of a transmission grating is shown in FIG. 32A and comprises a fused silica substrate, an amorphous silicon grating layer (refractive index 3.48), a top impedance matching layer consisting of 190 nm silicon oxynitride (refractive index 1.67), and a bottom impedance matching layer consisting of 260 nm titanium dioxide (refractive index 2.18). The grating period is 1.035 μm and the duty cycle 50%, i.e., the silicon ridge width is 517.5 nm and the width of the trench is 517.5 nm. The grating is optimized for operation in the ITU telecom C-band, 1525-1565 nm, with an angle of incidence of 50°. An analysis of the grating modes propagating through the grating as described above reveals the presence of three waveguide modes with effective indices of about 1.2 (mode 1), 2.7 (mode 2), and 3.3 (mode 3).

Figure 32B:
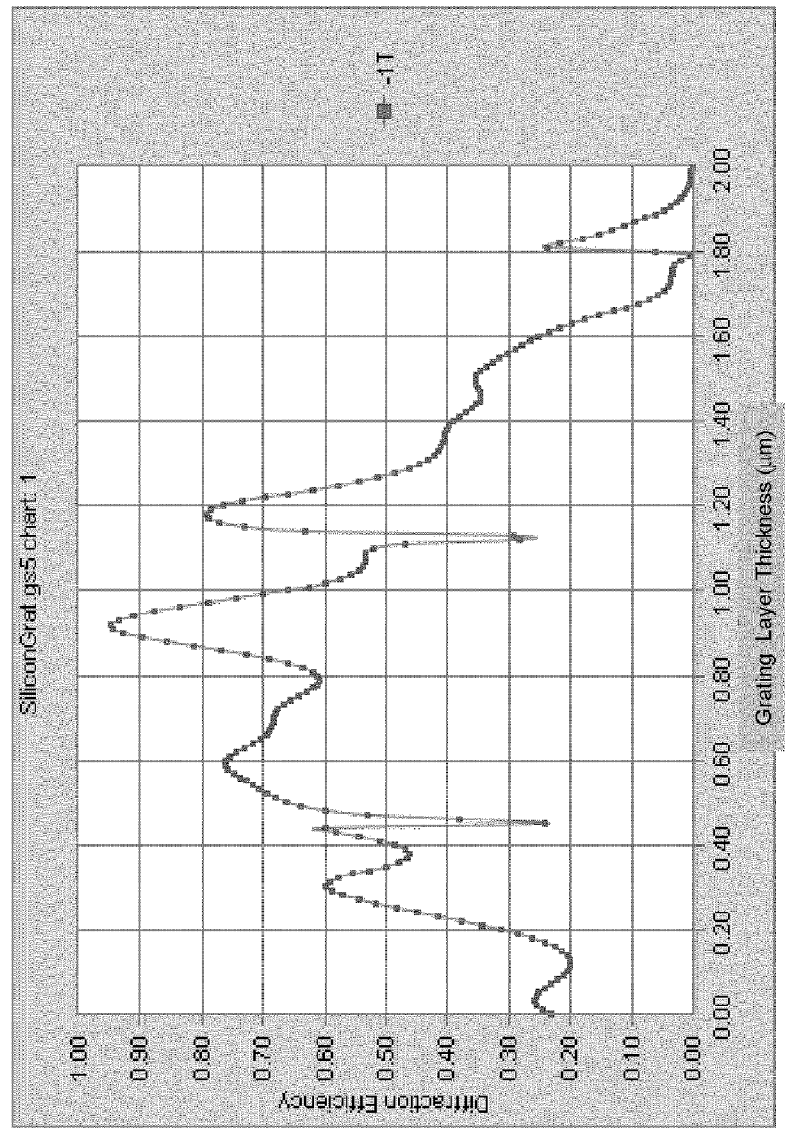
FIG. 32B is a calculated plot of diffraction efficiency versus grating layer thickness for the exemplary optical grating of FIG. 32A.

FIG. 32B is a plot of the diffraction efficiency as a function of grating layer thickness into the first transmitted diffraction order for the embodiment of FIG. 32A with an input wavelength of 1.545 μm, a design incidence angle of 50°, and TE-polarized input. The diffraction efficiency peaks at grating layer thicknesses of 300 nm, 600 nm, 900 nm, 1200 nm and 1500 nm. These are the thicknesses that correspond to a phase shift of π for, respectively, modes 1 and 3, modes 1 and 2, modes 1 and 3, modes 2 and 3, and modes 1 and 2. At those thicknesses, the π phase shift results in substantial reduction of the zeroth transmitted order and concomitant enhancement of the negative first transmitted order. It is clear from FIG. 32B that high diffraction efficiency can be achieved in the presence of more than two propagating grating modes.

Figure 33A:
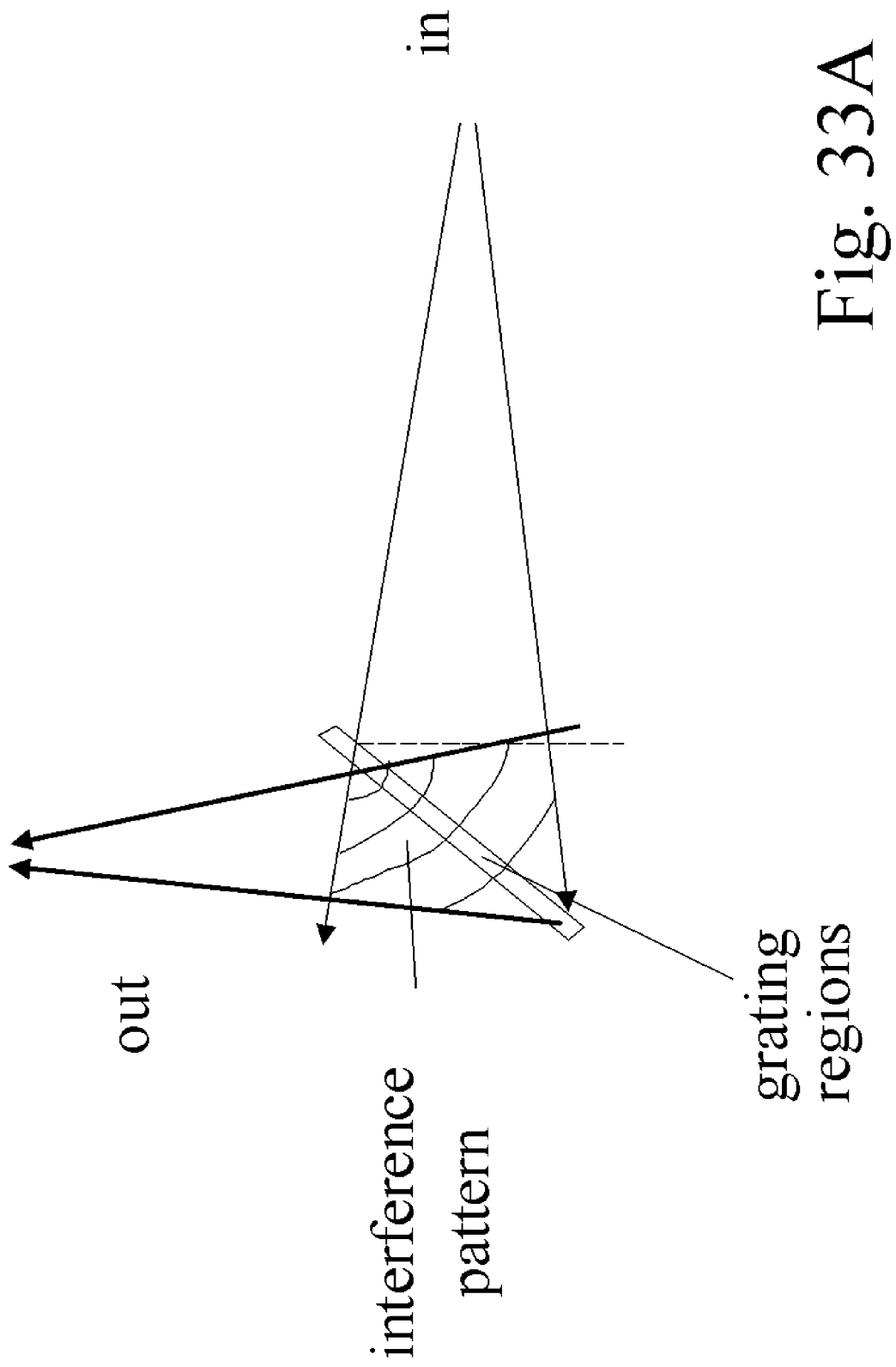
FIGS. 33A and 33B illustrate schematically exemplary optical interference patterns calculated in a grating layer.
Figure 33B:
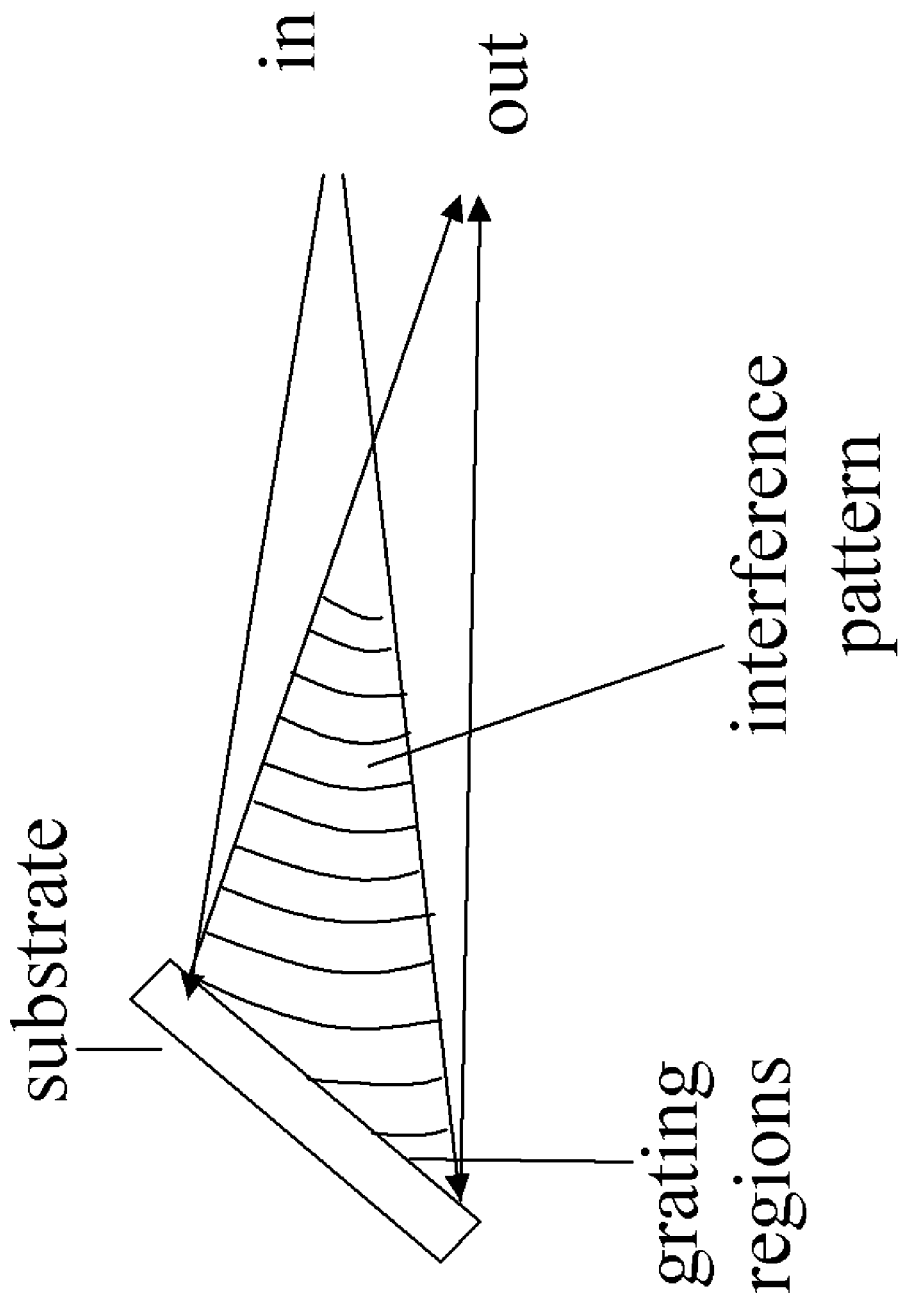
Figure 34:
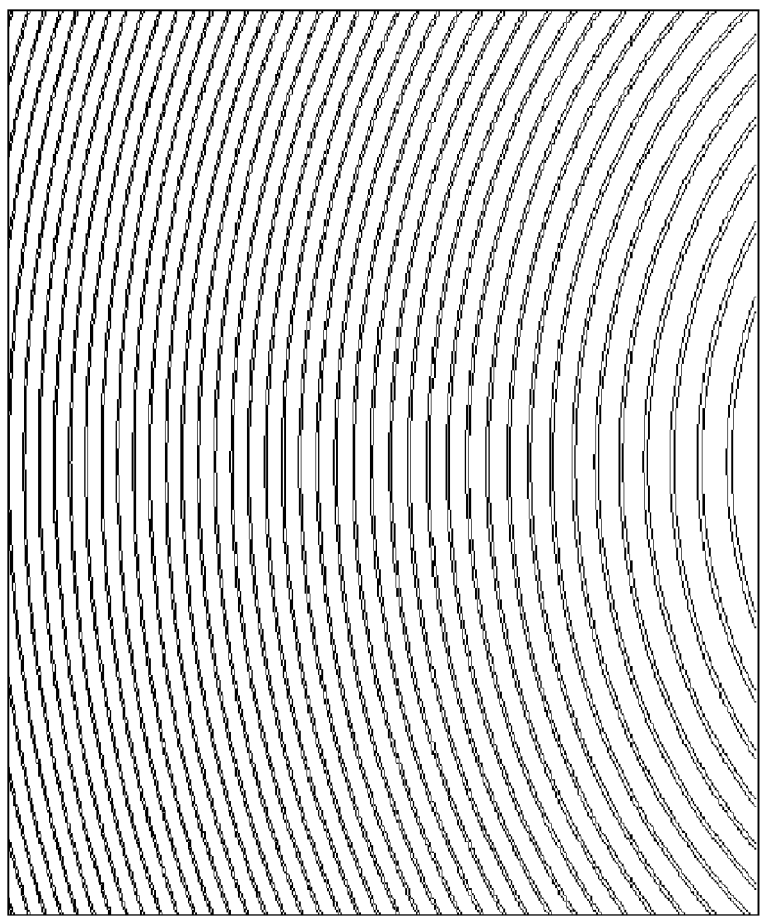
FIG. 34 is a schematic plan view of an exemplary optical grating layer arranged according to a calculated interference pattern.

Optical transmission and reflection gratings as disclosed or claimed herein can be arranged to provide imaging, focusing, collimation, or other spatial manipulations of the diffracted optical signal, by suitable variation of grating spacing on the grating or by suitable curvature of the grating lines. Such arrangements of the grating lines can be designed by computed interference of simulated optical signals, as disclosed in U.S. Pat. No. 7,349,599 and U.S. Pat. Pub. 2007/0053635, each of which is hereby incorporated by reference as if fully set forth herein. To account for varying angular incidence conditions in non-collimated input it may be useful to locally optimize the grating duty cycle to obtain an operationally acceptable level of diffraction efficiency or polarization dependent loss. FIG. 33A illustrates schematically computation of an interference pattern used to form a transmission grating. FIG. 33B illustrates schematically computation of an interference pattern used to form a reflection grating. FIG. 34 is a schematic plan view of a grating layer arranged according to an interference pattern calculated between a diverging input signal and a converging output signal, wherein the grating lines vary in spacing and curvature across the grating. That arrangement of the lines of the diffraction grating enables a flat optical grating, for example, to produce a diffracted signal that differs from the input signal with respect its convergence, divergence, or collimation properties. Such a flat, imaging grating can be used advantageously, for example, to reimage only one of several DWDM channels emerging from a first optical fiber onto the entrance face of a second optical fiber without the need for separate focusing elements.

Various materials have been disclosed for forming the exemplary embodiments disclosed above. Any suitable material or combination of materials can be employed for forming a grating layer, impedance matching layer, reflective layer, or substrate that exhibits suitable transparency over the relevant operational wavelength range and suitable bulk refractive index. Suitable material can include, are not limited to, silicon, doped silicon, silicon nitride, silicon oxynitride, titanium dioxide, cerium dioxide, aluminum oxide, tantalum pentoxide, aluminum oxynitride, beryllium oxide, bismuth oxide, chromium oxide, germanium, doped germanium, hafnium oxide, magnesium oxide, neodymium oxide, praseodymium oxide, scandium oxide, zinc selenide, zinc sulfide, zirconium oxide, silica, doped silica, borophosphate glass, borosilicate glass, soda lime glass, polymer, beryllium oxide, calcium fluoride, cerium fluoride, cryolite, hafnium fluoride, lanthanum fluoride, strontium fluoride, ytterbium fluoride, ambient atmosphere, air, or inert gas.

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof shall be construed as open ended terminology, with the same meaning as if the phrase "at least" were appended after each instance thereof.

What is claimed is:

1. An optical grating comprising a set of multiple, discrete, spaced-apart, elongated ridges protruding from a surface of a substrate and separated by intervening regions of an ambient medium, wherein:

each ridge comprises a corresponding bottom portion comprising a first non-gaseous dielectric material characterized by a refractive index greater than refractive indices of the substrate or the ambient medium, a corresponding intermediate portion comprising a second non-gaseous dielectric material characterized by a first grating bulk refractive index that is greater than the refractive indices of the ambient medium or the first dielectric material, and a corresponding to portion comprising a third non-gaseous dielectric material characterized by a refractive index greater than the refractive index of the ambient medium and less than the first grating bulk refractive index; a side surface of each ridge is not perpendicular to the surface of the substrate;

the intermediate portions of the ridges together comprise a set of multiple, discrete, elongated first grating regions of a grating layer, which first grating regions comprise the second non-gaseous dielectric material and are arranged with intervening elongated second grating regions of the grating layer, which second grating regions comprise the ambient medium;

the bottom portions of the ridges together form a first impedance matching layer comprising a set of multiple, discrete, spaced-apart, elongated regions of the first non-gaseous dielectric material with intervening elongated regions of the ambient medium, the first impedance matching layer being arranged between the grating layer and the substrate;

the top portions of the ridges together form a second impedance matching layer comprising a set of multiple, discrete, spaced-apart, elongated regions of the third non-gaseous dielectric material with intervening elongated regions of the ambient medium, the grating layer being arranged between the first and second impedance matching layers, thickness and refractive index of each of said impedance matching layers is arranged so that the optical grating exhibits reflection of an optical signal transmitted through a corresponding surface of the grating layer that is less than such a reflection in the absence of that impedance matching layer;

the first and second grating regions are characterized locally by (i) a local grating spacing along the grating layer in a local direction substantially perpendicular to the elongated grating regions, (ii) a local grating duty cycle, and (iii) a local grating thickness along a direction normal to the grating layer;

for at least a first localized area of the grating layer, the first and second grating regions are arranged to exhibit a first specified grating spacing to diffract at a first specified diffracted angle an optical signal at a specified wavelength within an operational wavelength range when said optical signal is incident on the first localized area of the grating layer at a first specified incidence angle; and for at least the first localized area of the grating layer, the first and second grating regions are arranged so that first and second optical modes at the specified wavelength propagating in a direction normal to the grating layer (i) propagate with respective first and second modal indices, and (ii) accrue a phase difference about equal to an odd multiple of $\pi$ upon propagating through the grating layer once.

2. The optical grating of claim 1 wherein the second dielectric material comprises silicon, doped silicon, silicon nitride, silicon oxynitride, titanium dioxide, cerium dioxide, aluminum oxide, tantalum pentoxide, aluminum oxynitride, beryllium oxide, bismuth oxide, chromium oxide, germanium, doped germanium, hafnium oxide, magnesium oxide, neodymium oxide, praseodymium oxide, scandium oxide, zinc selenide, zinc sulfide, or zirconium oxide.

3. The optical grating of claim 1 wherein the ambient medium comprises silica, doped silica, borophosphate glass, borosilicate glass, soda lime glass, silicon nitride, silicon oxynitride, titanium dioxide, cerium dioxide, aluminum oxide, tantalum pentoxide, polymer, ambient atmosphere, air, or inert gas.

4. The optical grating of claim 1 wherein the refractive index of the ambient medium is about equal to unity.

5. The optical grating of claim 1 wherein the first or third dielectric material comprises silicon nitride, silicon oxynitride, titanium dioxide, cerium dioxide, aluminum oxide, tantalum pentoxide, silica, doped silica, borophosphate glass, borosilicate glass, soda lime glass, polymer, beryllium oxide, calcium fluoride, cerium fluoride, cryolite, hafnium fluoride, lanthanum fluoride, strontium fluoride, or ytterbium fluoride.

6. The optical grating of claim 1 wherein a transverse cross section of each of the first and second grating regions is substantially rectangular or substantially trapezoidal.

7. The optical grating of claim 1 wherein, for at least the first localized area of the grating layer, an efficiency for diffraction of the optical signal, incident at the first incidence angle and diffracted at the first diffracted angle, is greater than about 90% from about 1525 nm to about 1565 nm.

8. The optical grating of claim 1 wherein, for at least the first localized area of the grating layer, the first and second grating regions are arranged to exhibit a first specified grating duty cycle to yield an efficiency for diffraction of the optical signal, incident at the first incidence angle and diffracted at the first diffracted angle, that varies with polarization of the optical signal only within a specified operationally acceptable range.

9. The optical grating of claim 8 wherein, for at least the first localized area of the grating layer, the efficiency for diffraction of the optical signal varies with polarization by less than ±0.25 dB from about 1525 nm to about 1565 nm.

10. The optical grating of claim 1 wherein the grating layer is substantially flat.

11. The optical grating of claim 1 wherein the first grating regions comprise a set of substantially straight, substantially parallel linear regions.

12. The optical grating of claim 1 wherein the first and second grating regions are arranged according to an interference pattern derived from computed interference in the grating layer between a simulated design input optical signal and a simulated design output optical signal.

13. The optical grating of claim 1 wherein the grating layer is substantially flat, and the sets of first and second grating regions are arranged so that respective wavefronts of an incident optical signal and a portion of that signal diffracted by the optical grating exhibit differing convergence, divergence, or collimation properties.

14. The optical grating of claim 1 wherein the refractive index of the substrate is between about 1.4 and about 1.5, the refractive index of the first dielectric material is about 1.7, the first grating bulk refractive index is greater than about 2, and the refractive index of the third dielectric material is between about 1.4 and about 1.5.

15. The optical grating of claim 14 wherein the substrate comprises silica or doped silica; the first dielectric material comprises aluminum oxide or silicon oxynitride, the second dielectric material comprises silicon nitride, and the third dielectric material comprises silica or doped silica.

16. The optical grating of claim 14 wherein, for at least the first localized area of the grating layer, the local grating spacing is about 1 μm, the local grating duty cycle is between about 50% and about 60%, the grating layer is about 1 μm thick, the first impedance matching layer is between about 0.2 μm and about 0.3 μm thick, and the second impedance matching layer is about 0.3 μm thick.

17. The optical grating of claim 1 wherein: the refractive index of the substrate is between about 1.4 and about 1.5; the refractive index of the first dielectric material is between about 2 and about 2.2; the first grating bulk refractive index is greater than about 3; and the refractive index of the third dielectric material is about 1.7.

18. The optical grating of claim 17 wherein the substrate comprises silica or doped silica; the first dielectric material comprises silicon nitride or silicon oxynitride, the second dielectric material comprises amorphous silicon, and the third dielectric material comprises silicon oxynitride.

19. The optical grating of claim 17 wherein, for at least the first localized area of the grating layer, the local grating spacing is about 1 μm, the local grating duty cycle is between about 40%, the grating layer is about 0.4 μm thick, the first impedance matching layer is between about 0.2 μm and about 0.3 μm thick, and the second impedance matching layer is about 0.2 μm thick.

* * * * *

UNITED STATES PATENT AND TRADEMARK OFFICE
CERTIFICATE OF CORRECTION

| | | |
|---|---|---|
| PATENT NO. | : 8,165,436 B2 | Page 1 of 1 |
| APPLICATION NO. | : 12/265721 | |
| DATED | : April 24, 2012 | |
| INVENTOR(S) | : Mossberg et al. | |

It is certified that error appears in the above-identified patent and that said Letters Patent is hereby corrected as shown below:

In The Claims

Column 20, line 3 (Claim 1):

replace "corresponding to portion" with --corresponding top portion--.

Signed and Sealed this
Twenty-ninth Day of March, 2016

Michelle K. Lee
*Director of the United States Patent and Trademark Office*